(12) United States Patent
Bonhoff

(10) Patent No.: US 9,195,812 B2
(45) Date of Patent: Nov. 24, 2015

(54) METHOD FOR ENTERING A PASSWORD AND COMPUTER PROGRAM (THEREFOR)

(71) Applicant: Hannes Bonhoff, Berlin (DE)

(72) Inventor: Hannes Bonhoff, Berlin (DE)

(73) Assignee: Hannes Bonhoff, Berlin (DE)

( * ) Notice: Subject to any disclaimer, the term of this patent is extended or adjusted under 35 U.S.C. 154(b) by 0 days.

(21) Appl. No.: 13/798,202

(22) Filed: Mar. 13, 2013

(65) Prior Publication Data
US 2014/0047525 A1 Feb. 13, 2014

(30) Foreign Application Priority Data

Mar. 13, 2012 (DE) .......................... 10 2012 005 415
Oct. 18, 2012 (DE) .......................... 10 2012 020 817

(51) Int. Cl.
G06F 21/31 (2013.01)
G06F 21/36 (2013.01)

(52) U.S. Cl.
CPC ................ *G06F 21/31* (2013.01); *G06F 21/36* (2013.01)

(58) Field of Classification Search
CPC .......... G06F 21/21; G06F 21/31; G06F 21/36
USPC ............................................................ 726/7
See application file for complete search history.

(56) References Cited

U.S. PATENT DOCUMENTS

| | | | | |
|---|---|---|---|---|
| 4,050,234 A | * | 9/1977 | Toshio | 368/185 |
| 4,655,606 A | * | 4/1987 | Giger | 368/160 |
| 4,726,687 A | * | 2/1988 | Gander | 368/10 |
| 5,784,342 A | * | 7/1998 | Genta | 368/76 |
| 6,084,828 A | * | 7/2000 | Bland et al. | 368/80 |
| 6,720,860 B1 | * | 4/2004 | Narayanaswami | 340/5.54 |
| 6,724,692 B1 | * | 4/2004 | Akahane et al. | 368/204 |
| 6,729,738 B2 | * | 5/2004 | Fuwausa et al. | 362/84 |
| 6,751,164 B1 | * | 6/2004 | Sekiguchi | 368/80 |
| 7,027,362 B2 | * | 4/2006 | Lizzi et al. | 368/37 |
| 7,778,118 B2 | * | 8/2010 | Lyons et al. | 368/69 |
| 8,132,243 B2 | * | 3/2012 | Bychkov | 726/9 |
| 8,467,272 B2 | * | 6/2013 | Fujisawa | 368/47 |
| 8,560,947 B2 | * | 10/2013 | Gillespie et al. | 715/702 |
| 2004/0113819 A1 | * | 6/2004 | Gauthey et al. | 341/34 |
| 2005/0007886 A1 | * | 1/2005 | Mazzetti | 368/80 |
| 2009/0034804 A1 | * | 2/2009 | Cho et al. | 382/116 |
| 2010/0091616 A1 | * | 4/2010 | Bonhoff | 368/80 |
| 2011/0182152 A1 | | 7/2011 | Jouvenot | |
| 2011/0267926 A1 | * | 11/2011 | Yamagami | 368/10 |

FOREIGN PATENT DOCUMENTS

CH 694109 7/2004
DE 602005001612 4/2008

(Continued)

OTHER PUBLICATIONS

Suo, X., et al., "Graphical Passwords: A Survey", Georgia State University, Atlanta, USA 2005.

*Primary Examiner* — Hadi Armouche
*Assistant Examiner* — Shahriar Zarrineh
(74) *Attorney, Agent, or Firm* — Harness, Dickey

(57) ABSTRACT

A method is provided for entering a password. The method includes: providing a display means which is coupled to a data processing means; displaying a timepiece with a first representation of a timepiece element on the display means, detecting a user input; and assigning an alphanumeric character of the password to the user input and the first representation of the timepiece element or a further representation of the timepiece element. In some instances, the first representation of the timepiece element is time dependent.

20 Claims, 20 Drawing Sheets

(56) References Cited

FOREIGN PATENT DOCUMENTS

| | | |
|---|---|---|
| DE | 102010020466 | 5/2010 |
| DE | 102009016527 A1 * | 10/2010 |
| WO | WO0072095 | 11/2000 |
| WO | WO2011057149 | 5/2011 |
| WO | WO2011069218 | 6/2011 |
| WO | WO2011143476 | 11/2011 |
| WO | WO2012070009 | 5/2012 |

* cited by examiner (a)

(b)

(c)

(d)

(a)

(b)

(c)

(d)

(e)

(f)

(a)

(b)

(c)

(d)

(e)

(f)

(a)

(b)

(c)

(d)

METHOD FOR ENTERING A PASSWORD AND COMPUTER PROGRAM (THEREFOR)

CROSS-REFERENCE TO RELATED APPLICATIONS

This application claims the benefit and priority of German Serial No. 102012005415.7 filed Mar. 13, 2012 and German Serial No. 102012020817.0 filed Oct. 18, 2012.

FIELD

The invention relates to a method for entering a password and a computer program

BACKGROUND OF THE INVENTION

A plurality of electronic devices are equipped with a touch-sensitive screen, a so-called touch screen, instead of a keyboard. One of the most common devices with touch screen include mobile phones, especially smartphones and tablet computers and PDAs (personal digital assistants). Touch screens can also be found in many other electronic devices, such as in navigation systems, remote controls and door locks.

A large part of electronic devices with a touch screen contains personal data such as emails, passwords and credit card numbers that must be protected against unauthorized access. For this purpose, usually, the input of a password is required when the device is turned on. After correct input of the password a certain action is executed, such as unlocking the device for full use. As an alternative to entering a password, a specific pattern can be required, which is drawn with a finger on the touch screen. As described in patent specification WO 2011/143476 A1, the input of different patterns can also merely result in the execution of actions which do not unlock the device for full use, such as displaying the email mailbox during activated screen lock.

If the device is not used for a certain time, a screen lock usually activates automatically or the device goes into standby mode. For further use of the device after the screen lock or the standby mode was activated, it is required to enter the password again. For devices such as electronic door locks with touch screen the primary function of such devices is to provide protection from unauthorized access. After input of the correct password on a door lock, an action is executed that allows to open the door.

For password input via a touch screen usually a keyboard is displayed on the touch screen on which the letters and/or numbers of the password are successively touched with a finger tip. Since the display of the time is an important feature especially on mobile electronic devices such as smartphones, the current time is displayed in addition to the keyboard often in combination with the date. When the screen lock is activated, therefore, the current time can be read without deactivating the screen lock.

For a comfortable input of the password, the keys of the keyboard which is displayed for entering the password are usually of similar dimension as a fingertip. Already with a keyboard with the numbers 0 to 9, the keyboard occupies about two-thirds of the screen on a smartphone. For the input of the above mentioned pattern a similar amount of space is needed on the screen as well. This has the disadvantage that the remaining space is often not sufficient to display additional information. Such additional information could for example include notifications about the latest calendar events or new messages such as email, SMS or MMS. The display of the time is limited by the display of a keyboard on the screen as well. Here, the remaining space on the screen is not sufficient to display an analog clock in a comfortable size for reading. The time display while displaying a keyboard is therefore mainly based on simple digital clocks.

Another disadvantage of the password input by tapping the alphanumeric characters such as letters or numbers of the password on a keyboard displayed on the touch screen are the traces that are left on the touch screen. These smudges can firstly result from residues on the touch screen or secondly from sweat or grease on the finger. The touch screen can be dirty e.g. from residues of detergent, dust or sweat and grease for example from putting a smartphone to the ear to make phone calls. In this layer the finger or in general the object with which the touch screen is operated then draws the smudges of the password. With a residue free clean touch screen on the other hand, the sweat and grease on the finger are sufficient to leave traces of the password on the touch screen. Such traces will remain on the screen until they are worn away.

Based on the smudges on the touch screen, the alphanumeric characters from the password can be read which makes it considerably easier to decrypt the password and thus gain unauthorized access. The pattern described in patent specification WO 2011/143476 A1, which is drawn with a finger on the touch screen can as well be detected from the smudges left on the touch screen.

SUMMARY OF THE INVENTION

This section provides a general summary of the disclosure, and is not a comprehensive disclosure of its full scope or all of its features.

Object of the invention is to provide improved technologies for entering a password, wherein the password entry takes up less space on the screen and where entering the password preferably leaves no traces that can be used to decrypt the password.

According to one aspect, the invention provides a method for inputting a password with the following steps: providing a display means which is coupled to a data processing means, displaying a timepiece with a timepiece element on the display means, wherein a first representation of the timepiece element is time dependent, detecting a user input and assigning an alphanumeric character of the password to the user input and the first representation of the timepiece element.

The display means is connected to the data processing means in a way allowing to detect and process a user input by means of a user interface, such as a keyboard, a mouse, a trackball, a scroll wheel, a touch pad, and/or a function key. The display means may be a touch sensitive display device, also known as touch screen. For a touch sensitive display device, a user input in the form of a contact with the display device can be detected and evaluated by the data processing device. Such display devices are well known from the state of the art. They allow for easy control of the data processing device. The data processing device may comprise one or more processors. Furthermore, at least one memory unit may be provided in the data processing device. The memory device can be designed as volatile memory such as random access memory (RAM) or as a non-volatile memory, for example, as a magnetic storage medium (hard disk), EEPROM, optical storage (CD, DVD), digital memory (flash memory) or a semiconductor memory (Solid State Drive). The data processing device may include a communications adapter, for example, for a network (local area network), a USB port, a wireless network (wireless local area network), Bluetooth and/or for near field communication.

The timepiece displayed on the display device can correspond to any form of timepiece. It may thus, for example, correspond to wrist watches, wall clocks, longcase clocks, pocket watches, church clocks or sand clocks. Thus, time can generally be represented in both digital and analog manner. Numbers move for the display of the time on a digital timepiece and hands move for the display of the time on an analog timepiece. Besides the commonly existing indication of hours and minutes there can also be included additional indicators such as Seconds, date, power reserve, moon phases and the times in other time zones. When using a power reserve indicator it is preferable to use it for display of the state of charge of a battery of the data processing device. In addition to conventional full circle scales with 12 hours and 60 minutes also 6 hours, 24 hours or semi-circular scales for instance can find application. Straight scales that are not curved along a circle can be used as well. Combinations of digital and analog displays are also possible.

It is provided that the timepiece shown on the display device comprises a timepiece element whose representation is time-dependent. As used herein, timepiece element or only element generally refers to parts or components of a timepiece. A time-dependent representation of a timepiece element describes a representation that is changing over time such that at one point in time the representation of the timepiece element differs from the representation at another point in time. The time dependence of the representation of the timepiece element can be characterized by both a direct dependence on the time as well as by an indirect dependence on the time. With a direct dependence on the time, for example, a specific representation of the timepiece element is assigned to a specific time. An hour hand for example points at the hour "4" at 4 o'clock and at the hour "8" at 8 o'clock and its representation thus changes with the passage of time either continuously or periodically abruptly. For an indirect dependence on the time, the representation of a timepiece element varies also with the passage of time, but as a function of a different quantity. A power reserve indicator may be mentioned as an example, which indicates the current state of charge of a battery of the data processing device. Here the representation of the power reserve indicator changes with the passage of time in direct dependence with the charge state of the battery. It is therefore intended that the representation of the timepiece changes with the passing of the time. This ensures that on the basis of the representation of the timepiece at a certain point in time, a different representation is displayed when one looks at the display device at a different point in time.

The user input may in general relate to the operation of an input device. Commonly known input devices for example are keyboards, computer mice, function buttons, trackballs, touch pads, touch screens, stylus pens and scroll wheels. In general a user input comprises actions, such as pressing buttons, turning the scroll wheel or trackball and touching touch pads and touch screens. A user input may comprise one or more actions of the user. A user input using a touch screen can generally refer to any single contact or plurality of contacts with a finger or a dedicated stylus or object. Furthermore, a contact can be carried out simultaneously with a plurality of fingers, such as the zooming in on an image or document by leading two fingers away from each other. A contact of the touch screen may be a short tapping or a sustained contact for a certain period of time at a certain position of the touch screen. A contact can also correspond to a quick swipe along the touch screen as when scrolling web pages or a slower drawing along the touch screen as when selecting text. The swiping or drawing of the contact can be carried out along straight lines and along curved lines as well as along ellipses and circles.

An alphanumeric character of the password can be assigned to the user input and the first representation of the timepiece element. Here, the user input can serve as a trigger for the registration of a character of the password by the data processing device. In addition to the function as a trigger, the position, type and duration of the user input on the display device can be registered by the data processing device and used for the assignment of a character of the password. Based on the data of the user input in conjunction with the representation of the timepiece element, the data processing device can register an alphanumeric character of the password. In an analog timepiece, which for example displays the time 6:30 o'clock, the hour hand may be defined as timepiece element and can be clicked or tapped by the user to assign the number "6" to the position of the hour hand. Likewise, in this example, the minute hand may be defined as timepiece element and upon tapping the minute hand the number "30" can be assigned to the position of the minute hand. The displayed numbers on a digital timepiece can also be tapped and thus registered as characters of the password from the data processing device. The password input may also be limited to one timepiece element, such that no other can be selected by the user input. In this case, the position of the user input on the display device is not of importance. In this case, the user input is used only as a trigger for the registration of the character indicated by the timepiece element.

According to a further aspect, the invention provides a method for inputting a password with the following steps: providing a display means which is coupled to a data processing means, displaying a timepiece with a timepiece element on the display means, wherein a first representation of the timepiece element is time dependent, detecting a user input and assigning an alphanumeric character of the password to the user input and a further representation of the timepiece element.

A character of the password can be assigned to the user input and a further representation of the timepiece element. On an analog timepiece, a first representation of a timepiece element may for example relate to an hour hand which indicates the hour "6". A further representation of the timepiece element in this example may relate to the same hour hand, however, indicating the hour "4". In combination with the user input in this example, the number "4" can be registered as a character of the password.

The timepiece element can be transferred by means of the user input from the first representation to the further representation, wherein the alphanumeric character of the password is assigned to the further representation of the timepiece element.

According to one aspect of the method according to the invention it is provided to transfer the timepiece element from one representation to another representation by means of the user input. This process may correspond, for example, to an adjustment of the time indicated by the timepiece. With an analog timepiece with an hour hand at the 6 o'clock position, the hour hand may for instance be clicked and dragged to the 4 o'clock position to enter the number "4" of the password. With a digital timepiece, the numbers of the display can be adjusted by swiping the finger over them. Thus, by means of a user input on an hour display with a 12-hour scale, any number between "1" and "12" can be set.

It is provided in an embodiment, to display a further timepiece element of the timepiece, wherein a first representation of the further timepiece element is not time dependent, wherein said further timepiece element is transferred by means of the user input from the first representation to a further representation and wherein the alphanumeric character of the password is assigned to the further representation of the further timepiece element and a representation of the timepiece element.

A timepiece element whose representation is not dependent on time, is displayed the same way at all times. For an analog timepiece, this applies e.g. to the hour scale with the corresponding hour indices and hour numbers. According to one aspect of the method of the present invention, the representation of such a non-time-dependent timepiece element is changed by means of a user input. The hour scale of an analog timepiece for example can be rotated by a certain angle. It should be noted that the transfer of a non-time-dependent timepiece element from one representation to another representation based on a user input is not to be regarded as a time-dependent change of the representation. A character of the password can be assigned to the altered representation of the non-time-dependent timepiece element in combination with a representation of a time-dependent timepiece element. As an example, an analog timepiece may be mentioned where the time-dependent timepiece element is a minute hand pointing at the minute "15" and the non-time-dependent timepiece element is an hour scale. Based on a user input, the hour scale can be rotated 60 degrees clockwise, so that the minute hand points at the hour "1" of the hour scale and the number "1" can be assigned to the password. Thus, based on a user input, any number between "1" and "12" can be set on the minute hand with the hour scale.

In an embodiment of the invention it is provided that the representation of the timepiece element and/or the representation of the further timepiece element, after completion of the user input, is transferred back from the respective further representation to the respective first representation.

After the representation of a timepiece element has been changed based on a user input, the timepiece element can be returned to the original representation. It is provided here, that the transfer to the original representation is performed by the data processing device and is not based on a user input. For example, when the minute hand in its original position at the minute "15" is drawn to another position by means of a contact with the touch screen, after loosening the contact, the minute hand can re-set to the minute "15". Thus, the number of the password that was entered on the timepiece is no longer displayed after entering and the originally displayed time is readable again.

In one embodiment of the invention, the method comprises the following steps: detecting a further user input during the transfer of the timepiece element and/or of the further timepiece element from the respective further representation back to the respective first representation and assigning a further alphanumeric character of the password to the representation of the timepiece element and/or the representation of the further timepiece element at the time of the further user input or transfer of the representation of the timepiece element and/or the representation of the further timepiece element at the time of the further user input to a further representation and assigning a further alphanumeric character of the password to the further representation of the timepiece element and/or the further representation of the further timepiece element.

According to a further embodiment, it is provided that the timepiece is changed between the user input and the further user input. It may be provided that between the user input (for example, a touch) and the further user input (for example, a further touch) the timepiece element is transferred back to the first representation. The transfer can take place continuously and slowly enough so that a further user input is possible, while the timepiece element is still transferred back to the first representation. A further character of the password can be assigned to the representation of the timepiece element at the time of the further user input. Alternatively, the timepiece element can be set to a new representation by means of the further user input, wherein the new representation is then associated with a character of the password. With a sufficiently slow return movement, thus, the moving timepiece element can be moved to a new position by a second user input, to which another character of the password is assigned. The movement generated by the second user input here blocks the return movement during the input period. The smudges which a finger leaves on a touch screen with such a password entry not only depend on the time at which the password was entered. The smudges left additionally depend on the waiting time between release of the first touch and establishing the second touch during the return movement as well as the speed of the return movement.

According to an embodiment, the method according to the invention includes the following steps: displaying a further timepiece with a timepiece element on the display means, wherein a first representation of the timepiece element of said further timepiece is time dependent, detecting a further user input and assigning a further alphanumeric character of the password to the further user input and the first representation of the timepiece element of said further timepiece or a further representation of the timepiece element of said further timepiece.

For the input of further alphanumeric characters of the password it is provided in an embodiment of the invention to display an additional timepiece on the display device. Another character of the password can be entered on the additional timepiece by the same method as the first character of the password has been entered on the first timepiece. By the display of any number of watches, thus, any number of characters of the password can be entered. Alternatively or additionally, it can be provided to enter multiple characters of the password on each timepiece. The display of multiple timepieces is commonly used to display the time in different time zones, countries or cities.

In accordance with another aspect of the invention a further user input is detected and a further alphanumeric character of the password is assigned to the further user input and a representation of the timepiece element or a representation of the further timepiece element or a representation of another timepiece element.

According to one embodiment it can be provided that a further user input is detected and a further alphanumeric character of the password is assigned the further user input and a representation of a timepiece element. Hereby, passwords of any length can be entered. If a timepiece is displayed with an adjustable timepiece element it can be provided that the timepiece element is further adjusted by means of a further contact, so that the timepiece is transferred to a further representation and a further alphanumeric character of the password is associated with the further representation. It can also be provided to generate multiple representations of the timepiece by means of several consecutively performed contacts, which are each associated with an alphanumeric character of the password. To enter further alphanumeric characters of the password, a timepiece element can be used which has already been used for the input of previous characters of the password. Similarly, to enter additional characters of the password, a timepiece element can be used which has not been used to enter a previous character of the password.

In an embodiment of the invention it is provided to assign a further alphanumeric character of the password to a further user input in combination with a representation of the timepiece element or a representation of the further timepiece element or a representation of the other timepiece element without a transfer of the timepiece element or the further timepiece element or the other timepiece element to a further representation.

Further characters of the password can be entered by means of timepiece elements that have previously been used to enter previous characters without changing the appearance of these timepiece elements. For example can displayed numbers be tapped for entering. Also when entering a previously entered character, the character can be registered without changing the representation of the timepiece element. Also, further characters of the password can be entered based on other, previously not used timepiece elements without changing the appearance of these previously not used timepiece elements.

In an embodiment, the user input comprises a plurality of actions of a user.

The user input can comprise several successive actions of the user. An action of a user refers to any use of an input device, such as clicking, scrolling, tapping or dragging. Before a character of the password is registered, one or more timepiece elements can be tapped/clicked or moved.

In a further embodiment, the user input comprises exactly one action of the user and a plurality of alphanumeric characters of the password are assigned to said user input, in combination with a representation of the timepiece element or a representation of the further timepiece element or a representation of the other/another timepiece element.

Several characters of the password can be assigned to a user input that comprises only one action of the user. Such action may, for example, relate to the tapping or clicking of a timepiece or a control button. By tapping a timepiece, for example, the time displayed in hours, minutes and seconds can be assigned to the password. Also, a timepiece element can be held in a given position or at a certain point on the timepiece element for a certain time period. Here, after a defined time interval, a certain number of the password can repeatedly be assigned to the point on the timepiece element or the position of the timepiece element.

In an embodiment of the method according to the invention, the display means is a touch-sensitive display means, and as user input, one or more contacts of the display means are detected.

The display means can correspond to a touch-sensitive display or accordingly a touch screen. A user input on a touch screen represents one or more contacts with the touch screen. A contact with a touch screen can be carried out with a finger or a dedicated stylus.

According to one aspect of the invention, the timepiece is represented as an analog timepiece and the timepiece element is an hour hand, a minute hand, a second hand or a power reserve indicator.

A timepiece with analog display may among others comprise one or more of the following timepiece elements: hour hand, minute hand, second hand, dial and case. With the usually used top view of timepieces on display screens, mainly the bezel is visible from the case. The dial can comprise scales for hours and minutes, as well as possibly for the seconds. Timepiece elements with time-dependent representation of an analog timepiece primarily are the hands, such as hour hand, minute hand and seconds hand. However, additional components of an analog timepiece, such as a date display, a power reserve indicator, moon phase display and display of the time in another time zone also contain timepiece elements with time-dependent representation.

According to a further aspect of the invention, the timepiece is represented as an analog timepiece and the further timepiece element is a dial or a bezel.

Analog timepieces comprise several timepiece elements whose representation for time indication is equal at all times. These are, for example, scales for hour, minute and seconds, the dial in general, the watch case with strap or the bezel. The numbers or labels of the different scales of analog timepieces represent timepiece elements with non-time-dependent representation.

An element of a timepiece can also consist of a combination of several components of the timepiece. With an analog timepiece, it may be useful to combine the bezel with the dial and the indices of the hour and minute scale, and to regard it as a composite timepiece element. Hence, when moving the bezel by means of a contact with the touch screen, the scale of the timepiece would move along.

According to a further aspect of the invention, the timepiece is represented as a digital timepiece and the timepiece element is one or more numbers or one or more letters.

The timepiece can be represented for example as a digital timepiece, where the timepiece element with a time-dependent representation is one or more numbers, one or more letters, or a combination thereof. With a digital timepiece, the display can comprise one or more of the following timepiece elements with time-dependent representation: hour, minute, seconds, as well as day, month and year, wherein the current values are displayed in the form of numbers or letters. As with a number disc, a number wheel or a number ray, in addition to the current values of the time, the already elapsed and the values yet to come can be visible on the display as well. Here, timepiece elements with several numbers or letters can be divided into a plurality of elements. The first number of the minute display can be defined as a separate timepiece element for the number of tens of minutes. A display of the month in the form of three-letter abbreviations, such as FEB for February, may thus be divided into three separate timepiece elements.

According to a further aspect of the invention, a computer program product is created which is stored on a data carrier and which is configured to carry out a method according to the present invention when executed by means of a data processing device.

The method according to the invention can be implemented in the form of a computer program in a suitable programming language such as C, C++, Objective-C or Java. The method can be integrated into an operating system such as Android, iOS or Windows, or be provided as a software that has to be installed separately. In the form of an Android application, or app, for example, the method according to the invention can be integrated into the lock screen and then used to unlock the device by entering a password. Possible data processing devices represent mobile phones, especially smart phones, personal computers, tablet computers and PDAs (personal digital assistants) as well as other electronic equipment, such as navigation systems, remote controls, and door and safe locks.

To illustrate the variety of possible timepieces that can be used to enter a password, a few examples are mentioned below. With the timepiece from patent specification WO 2011/069 218 A1, the password can for example be entered by adjusting the minute hand, wherein the entire hour display would rotate concurrently. With the timepiece from patent specification WO 00/072 095 A3, the timepiece elements corresponding to the password could be selected by tapping on them. With timepieces according to patent specification DE 602005001612 T2, the minute hand could be adjusted and, separately thereof, the planet gears with the hour numbers could be rotated by tapping on them. In the timepieces of patent specification WO 2012/070009 A1 and CH 694 109 A5 the inner and outer discs with the divided numbers could be rotated in order to sequentially set the numbers of the password. On the power reserve of timepieces according to patent specification US 2011/182152 A1, a three-digit password can be set by means of rotation of the discs.

Timepieces with digital time display in the form of numbers, such as described in patent specification WO 2011/057 149 A2, have the advantage that additional numbers to the numbers of the displayed time are visible on the timepiece. This is shown by the fact that for example the hour is presented in the form of a band, on which the possible numbers of the hours are applied. Every hour, such a band moves onward by one number, so that the current hour is read in a designated field. Outside of the designated field, the numbers of the past hours are visible on one side and the numbers of the coming hours are visible on the other side. Due to the additional numbers visible on the display, a timepiece as described in patent specification WO 2011/057 149 A2 offers a variety of options for password input by means of the method according to the invention.

On timepieces with digital time display such as described in patent specification WO 2011/057 149 A2 usually the hours are available from "1" to "12" and the minutes are available from "1" to "60". For entering a password on such a timepiece shown on a screen, it may be desirable to use a four-digit password with the numbers "0" to "9" for each digit. Due to the dimensions of the timepiece in patent specification WO 2011/057 149 A2, here, it is physically not possible from a spatial point of view to place the numbers "0" to "99" on the band with the hours. An animation of this timepiece is not subject to these physical constraints, so that in an embodiment of the method according to the invention any number of characters can be displayed at any distance on the bands, discs, cubes or rolls of the display.

A variety of electronic equipment with display device feature one or more function keys that can be used to enter the password by means of the method according to the invention. By pressing the function key by means of a user input it is provided here for instance to set one or more of the timepiece elements in motion. By further pressing the function key, the positions of the timepiece element or timepiece elements which correspond to the numbers of the password are recorded successively. Function keys are also known which in addition to the function as a push-button can also register the direction of a swiping by means of a finger on the button (see smartphone model Desire Z by manufacturer HTC). Such touch-sensitive function keys allow a scrolling and tapping as on a touch-sensitive display. It is possible for instance to select different elements of a timepiece by means of horizontal swiping on the function key and to adjust these then by means of vertical swiping. The use of a touch-sensitive function key for entering a password by the method according to the invention has the advantage that no smudges are left on the display device that can be used to decrypt the password. The smudges on the touch-sensitive function key lie on top of each other which makes them difficult to decipher. Alternatively, a region on the touch screen can be used for displaying a corresponding key. This function key shown on the touch screen is then used to control the displayed timepiece and thus used to enter the password by the method according to the invention. Instead of a function key a mouse connected to the device can also be used for entering a password by the method according to the invention. Here, turning the scroll wheel of the mouse can correspond to swiping the function key, while clicking a mouse button or pressing the scroll wheel is equivalent to pressing the function key. The use of trackballs or turning wheels that are directly integrated into the device are also possible for entering passwords.

The password can consist of one or more numbers or, when using a date display, also of one or more letters. The password can also be composed of numbers and letters. Letters and numbers can be summarized under the generic term alphanumeric characters. The password as specified herein can therefore be composed of any number of any alphanumeric characters. Passwords coupled with the current time are possible as well, such as an addition of two numbers with the values of hour and minute at the time of entering a password. Different passwords can be used for executing different password protected actions.

In a tapping based on a contact or a click using a mouse or a function key, the duration of the user input is usually very short. Thus, the position at the start of the user input (e.g. the establishment of a contact with the screen) is approximately equal to the position at the end of the user input (e.g. the release of the contact with the screen). It may be provided here, not to change the representation of the timepiece due to the user input. This is useful for instance if the number of the password that is to be entered already is indicated by the corresponding element of the timepiece. When maintaining the contact or the cursor of the mouse at a particular position on the screen, the representation of the timepiece can remain unchanged too. With a maintaining of a certain position, it can be provided that after a certain time period, a number of the password is assigned to the position of a timepiece element by the data processing device. Thus, the same number can as well be registered several times in succession by the data processing device by means of a maintaining of corresponding duration of a contact at a certain position.

The movement of an element of the timepiece due to the contact of the touch screen for entering the password may be done in a way that is comparable with adjusting the time. With a digital timepiece with two numbers each for the hour and minute a four-digit password can be entered, for example, by a swiping over the individual numbers in the vertical direction, wherein the swiping allows a kind of scrolling through the values of the respective number. Alternatively, the individual numbers can be tapped, whereby the number advances by one value. With an analog timepiece with hour hand, minute hand and seconds hand, a password consisting of three numbers can be entered by dragging the three hands to the respective angular positions which correspond to the respective value of the password on the scale of the dial. For these two methods of entering a password, one number of the password is assigned to every element of the timepiece which is moved by means of the contact with the touch screen and the password is visible after the input.

But the movement of an element of the timepiece due to the contact of the touch screen for entering the password can also be done in a way that is comparable with setting a combination of numbers in a mechanical combination lock with a dial such as can be found on vaults. With an analog timepiece, a hand of the timepiece can be used to successively set the numbers of the password on a scale of the dial. The other way around, the dial together with the scale can be rotated as well, wherein the numbers of the password are then set by the matching with a hand or a mark on the bezel, for example. The bezel with a corresponding mark can also be rotated around the scale of the timepiece to set the password.

The password input on a digital timepiece can be carried out similar to a slot machine, in which a plurality of rolls or accordingly wheels with numbers printed on them are arranged side by side and each are to be stopped in a particular position from a rotation. The individual rolls or accordingly wheels here correspond to the elements of the timepiece. Starting from a representation of the timepiece, the numbers of the hour and minute for instance are set in motion by means of a user input or automatically with a defined delay after displaying the login screen. The numbers are then stopped by another user input in exactly the position of the password. After stopping and registering the individual numbers of the password either the number of the password is visible on the display, or the wheels or accordingly rolls continue their movement, so that the entered password is not visible.

On an analog timepiece, the password input can also be carried out similar to dialing a phone number on a telephone with rotary dial. Here, by means of a user input, an element of the timepiece is rotated to a position which corresponds to a number of the password. After the corresponding number of the password has been registered, the timepiece element can move back into the original position, in which the current time is displayed again. To enter the next numbers of the password, this process is repeated wherein the timepiece element in each case is moved to the positions that correspond to the numbers of the password to be entered.

In order to move an element of the timepiece by means of a user input it is provided to position the mouse cursor or the contact on the screen in a way that the position coincides with the element of the timepiece which is to be moved. Hence, a hand of the timepiece can for instance be clicked or touched in the middle or at the end and thus be moved. For a circular element, such as the scale of the timepiece, therefore, many possible locations exist on the screen to click or touch the scale for a movement. In order to simplify the selection of a timepiece element, an area enclosing the timepiece element can be defined to be added to the element. With a thin hand it is therefore not necessary to precisely click or touch the hand for a movement. In a circular analog timepiece that does not fill the entire touch screen, the touch of the timepiece case or the bezel may be facilitated by also utilizing the area around the timepiece for a movement of the timepiece case or the bezel. This also has the advantage that with a touch of a finger, the timepiece is less obscured by the finger because the finger is further away from the timepiece on the touch screen.

In one embodiment of the method according to the invention it is provided to continue the movement of a timepiece element by means of a user input, even if the position of the user input no longer coincides with the timepiece element. If, for example, a minute hand is selected and adjusted by means of a contact with a touch screen, the touch can also be moved away from the timepiece without loss of control over the minute hand. Thus, the selected minute hand can be rotated or adjusted by sliding the contact along straight or curved lines from positions outside the timepiece. This has the advantage that the minute hand and the timepiece is less obscured by the contact. In a related embodiment of the method according to the invention, an element of the timepiece can be selected by a first user input, in order to be adjusted by one or more further user inputs at a different position on the screen. With a timepiece with adjustable hour, minute and seconds hands, for example, the seconds hand can first be tapped and thereby be selected and thereafter be adjusted by means of a further contact with the screen outside of the timepiece. After the adjustment of the seconds hand then the minute and hour hands can be adjusted in the same manner.

In a further embodiment of the method according to the invention it is provided that exclusively a particular element of the timepiece such as the scale of an analog timepiece for instance can be moved by means of a user input. Since no other elements of the timepiece can be moved here, it is in principle not of importance where the contact for movement of the movable element is positioned on the screen. Thus, the entire screen can be used to register a contact, based on which a number of the password then is entered.

The extent to which a timepiece element can be moved, can be defined in the settings for entering the password. Thus, it may for example be defined that a minute hand can only be rotated about the axis of rotation that is predetermined by the time indication. After this minute hand has been selected for adjustment by means of a contact with the screen for instance, a sliding of the contact along straight or curved lines can in any case only produce a rotation of the minute hand. Alternatively, it can be defined that a timepiece element cannot be rotated but only shifted. The shifting of a minute hand results in the minute hand to leave its position on the timepiece and to be virtually dismounted. With one or the other end of the dismounted minute hand, then the numbers of the password can successively be selected, for example on the hour scale.

The reversal of the direction of movement of an element of the timepiece can yield a number of the password so that a multi-digit password can be entered without releasing the contact with the touch screen. Here, a character of the password is assigned to the position of the element at which the direction of motion is changed. Similarly, however, also the position of the element when releasing the contact with the touch screen can be used to define the number of the password to be entered. Another alternative represents the holding of the contact in a certain position of the element of the timepiece for input of a number of the password. On a digital timepiece, one element of the display can be used to successively enter a plurality of numbers of the password, too.

It may be provided that the timepiece element is fixed in a specific representation during a contact that is lasting and not changing for a certain period of time and that an alphanumeric character of the password is assigned to this specific representation. Alternatively, according to a further embodiment it is provided that an alphanumeric character of the password is assigned to the representation of the timepiece when releasing the contact with the display device.

If the password contains several alphanumeric characters, the order of the alphanumeric character and the further alphanumeric character in the password can be determined by a temporal order of the user input and the further user input. Thus, if on a digital timepiece the minute is adjusted first, followed by the hour, and afterwards the seconds, the password can consist of the values set on minute, hour and seconds in exactly that order. Alternatively, the order of the alphanumeric characters of the password can correspond to the spatial arrangement of the elements of the timepiece. On a digital timepiece with the hour to the left, the minute in the middle and the seconds to the right, accordingly the password can consist of the set values of hour, minute and seconds in exactly that order.

The verification of the password can be carried out continuously by the electronic device while the password is entered. Also, an additional button can be displayed on the touch screen, wherein upon pressing the button the previous entry of the password is verified. Alternatively, it is provided to verify the character that is to be entered on an element of the timepiece first after the input of the next character of the password has begun on a further element of the timepiece. Here, the final position of the element is used to define the character of the password and not the movement of the element. It can also be provided, for example, to draw one or more circles around the timepiece by means of a contact with the touch screen after adjustment of the hands of an analog timepiece in order to trigger the registration of the set password. In addition to the trigger function for registering the password, such contacts can serve the benefit to cover the smudges previously generated on the screen when setting the password. After correct entry of the password, a password-protected action can be executed directly or with a defined delay by the data processing device.

It is possible to display one or more selector buttons in addition to the timepiece on the display device, which upon operation lead to the execution of an action protected by the password only after successful entry of the password. Before successfully entering the password, the operation of such selector buttons can lead to the execution of a non-password protected action, such as a display of information that only after entering the correct password, the password-protected action can be executed. Here, however, the change of the actions to be executed after pressing such selector buttons can already be regarded as a password-protected action in itself.

Password-protected actions in the sense given here may in principle relate to any action executable by the data processing device. As examples may be mentioned here the unlocking of the screen, or removing the screen lock, the display of sensitive data such as email inboxes and calendars, or opening a door lock. As mentioned earlier, password-protected actions can however also represent the simple display of one or more control panels based on which the user can access sensitive data stored in the electronic device for instance.

By entering different passwords it is provided to execute different actions. For example, the email inbox is displayed after entering a password, whereas the calendar is displayed after entering a different password. The execution of the password-protected actions can be carried out with the lock screen enabled without removing the screen lock. Thus, with active screen lock, only the functions can be used which were made available by the execution of password-protected action. To use additional functions then another password has to be entered again. Furthermore, it is provided to use the method according to the invention in the unlocked state of the device, i.e. with the screen lock deactivated. In the unlocked state of the device, except for the password-protected actions, usually all other functions of the device are useable. To execute a password-protected action in the unlocked state of the device then again the password must be entered on the timepiece displayed on the touch screen.

Entering different passwords may be used for identification of different users of the electronic device. In this case, each user of the device is assigned a distinct password based on which the device can identify the user. After entering a password, then the data, functions and programs of the corresponding user are loaded, whereas the data, functions and programs of other users are not accessible. Also, an administrator can be provided which can access all data, programs and functions of the device after entering a password as secure as possible.

After successfully entering the password, the timepiece can remain displayed on the screen and can be reset to the current time. The password-protected action can also be executed in a new window of the display, so that after closing the new window, the window with the timepiece is displayed again. After the password entry was carried out, the timepiece can also be hidden, for example, to make space on the screen for the execution of the password-protected action.

The definition of a password, which is to be entered before the execution of a certain action to be protected can be effected in different ways. In a definition mode of the electronic device, the password can be entered directly into a designated mask, for example, by means of a keyboard displayed on the touch screen. To confirm the password, with this method it would be useful to re-enter the password, but on the same timepiece, which is used to retrieve the password for the execution of the password-protected action. Alternatively, the definition of the password can also be done directly on the same timepiece, which is used to retrieve the password for the execution of the password-protected action. Here, on the other hand, it would be useful to additionally display the password on the touch screen for verification of the definition.

When defining a password, additional options can be set which affect the security of the password protection. The assignment of certain elements of the timepiece to certain numbers or digits for example determines which elements must be used in what order to enter which characters of the password. With the temporal order it can be defined, which characters of the password to enter on which elements of the timepiece before entering other characters. With the spatial order, however, the characters of the password are assigned to the elements of the timepiece. It can also be defined, which elements of the timepiece are also movable, although they do not have to be used to enter the password. The latter has the consequence that the smudges left on the touch screen cannot be explicitly assigned to the input of a character of the password by means of a particular element of the timepiece. Thus, for example, the time displayed by the timepiece can be changed before or after the password is entered.

Other options for password entry can represent the nature and duration of the contact on the touch screen which are necessary to enter an alphanumeric character of the password. Furthermore, a time period can be defined within which the password can be entered starting from the first contact of the touch screen. In addition, if one or more entries of the password have failed, a time period should be defined within which a re-entry is not possible. The accuracy with which the alphanumeric characters of the password must be entered can be specified as an option as well, e.g. plus minus two minutes on the minute scale. In order to prevent an automatic password input in case that the current time corresponds to the password, it may furthermore be defined that the password entry can occur first after the movement of the elements by means of a contact with the touch screen.

For the case that only a low security is required against unauthorized access, the method according to the invention can also be used in combination with an interactive, analog timepiece according to patent specification DE 102010020466 A1. In an embodiment of this timepiece, the hands are rotated by hand together with the bezel to view the current time. The angular position at which a mark on the bezel matches one of the hands corresponds to the current time with respect to the time unit of the hand. When using such an interactive, analog timepiece, the current time can be defined as password, which has to be read to execute the password-protected action. In order to execute the password-protected action hence it must be known how the current time is read on the interactive, analog timepiece. Since the adjustment of the hands does not necessarily result in an adjustment of the displayed time, it is not necessary here to reset the timepiece after correct password entry.

In the method according to the invention, the smudges of the touch on the touch screen cannot readily be used to decrypt the password. With a repeated tapping as well as a dragging of an element of the timepiece back and forth, this is due to the fact that the contacts on the touch screen overlay each other and thus the upper smudge covers the tracks of the one underneath. Since at different points in time, the timepiece indicates different times, different user inputs are required for password entry as well. The smudges left on the screen thus depend on the time at which the password has been entered. With an adjustment of the displayed time to the alphanumeric characters of the password, therefore, the knowledge of the exact time at which the password was entered would be required for a decryption of the password based on the smudges on the touch screen. Also, there are several ways to enter a specific password at a specific time, which further hampers the decryption of the smudges. When a password is entered on a power reserve display of a timepiece that displays the battery level of the device, the smudges on the screen depend on the state of charge of the battery at the time of entering the password. When a password is entered using a function key, furthermore, no smudges are left on the screen that can be used to decrypt the password.

Apart from the increased security of the password protection, the method according to the invention provides a dual functionality of the timepiece shown on the touch screen. Firstly, the timepiece serves as a display of the time and on the other hand it is used to enter the password. Since the necessary area for the display of a keypad intended for password input occupies a large part of the screen, significant space is saved by the dual functionality of the timepiece. Thus, with the method according to the invention it is possible for example to display analog timepieces on smartphones in a comfortable size for reading the time. The method according to the invention therefore enables the display of arbitrary watches in a scale of 1:1 and larger on the screen intended for password entry.

The primary commercial applicability of the method according to the invention exists in the password entry on electronic devices. Another commercial applicability is represented by the use of timepiece designs for a function that goes beyond the display of time particularly on smartphones and tablet computers. Many manufacturers of wrist watches use applications on smartphones and tablet computers, so-called apps, for marketing purposes of their products. These apps mostly work as scaled-down versions of the manufacturer's website, thereby limiting the integration into the device to displaying the page content. This has the disadvantage that such apps do not offer more to the customer than the webpages of the manufacturer whereby the interest in the app can be lost quickly. The method according to the invention, however, allows for a deeper integration of the app in the functioning of the device, so that the timepieces of the manufacturer in addition to the time display also provide the function of protecting the data stored on the smartphone from unauthorized access.

In some innovative watches the main attraction consists in changes of the appearance of the display with time either continuously or abruptly. However, such changes happen so slowly or rarely, that when demonstrating the mechanism e.g. on trade shows, the time must be adjusted. As owner of such timepieces one is thus likewise seduced to adjust the time to finally be able to experience the change of the display. Adjusting the time on an already correctly set timepiece however has little functional meaning. When integrating such innovative timepieces in smartphones and tablet computers based on the method according to the present invention, the adjustment of the time, however, has the function of entering the password. Thus, the attractiveness of a corresponding application is increased, which may result in improved commercial usability of the app as a marketing tool.

Further areas of applicability will become apparent from the description provided herein. The description and specific examples in this summary are intended for purposes of illustration only and are not intended to limit the scope of the present disclosure.

DESCRIPTION OF PREFERRED EMBODIMENTS

The drawings described herein are for illustrative purposes only of selected embodiments and not all possible implementations, and are not intended to limit the scope of the present disclosure.

[The invention is illustrated hereinafter by means of preferred embodiments with reference to figures.

Figure 1:
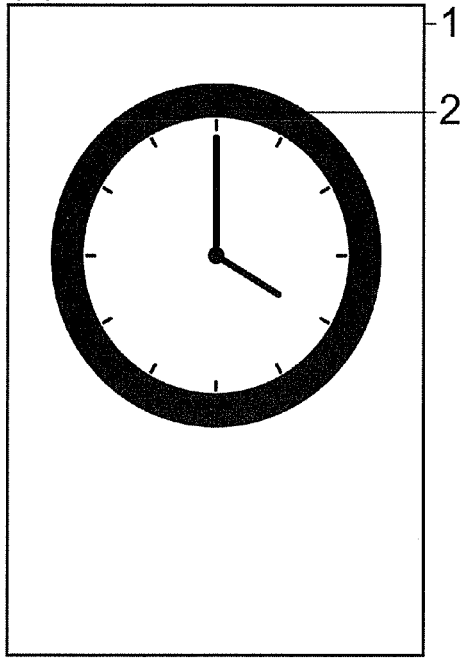
FIG. 1 shows the basic sequence of the method from the point of view of the user of an electronic device with touch screen.
Figure 1:
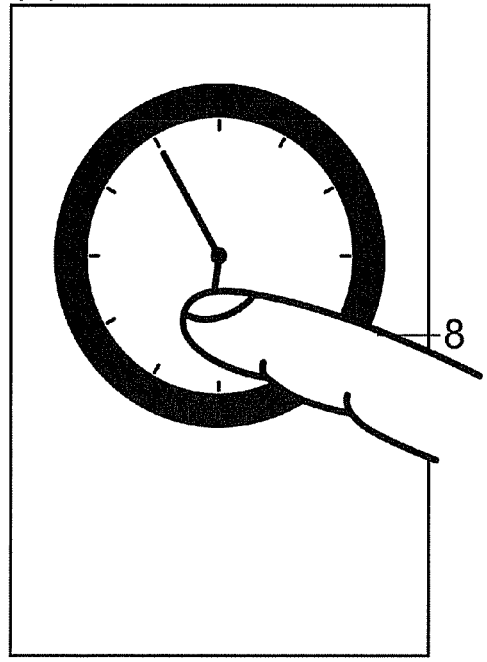
Figure 1:
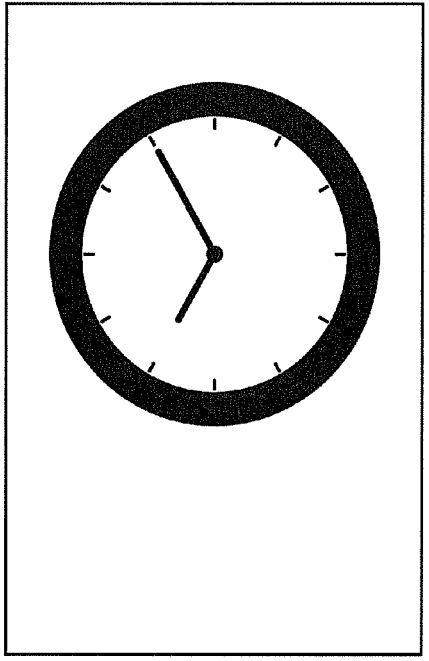
Figure 1:
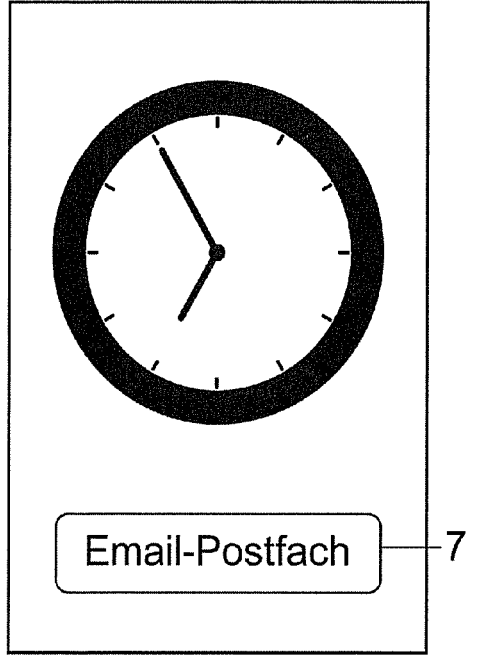
Figure 3:
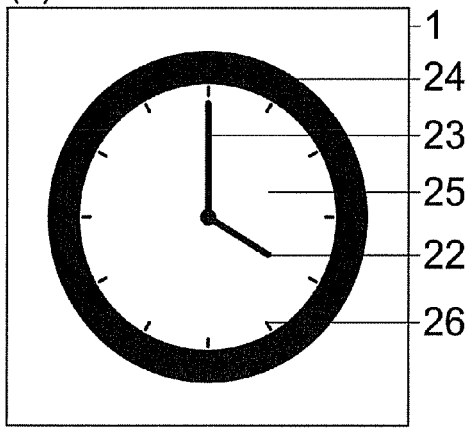
Figure 3:
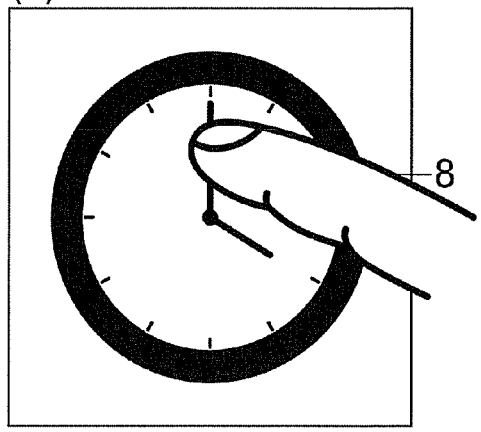
Figure 3:
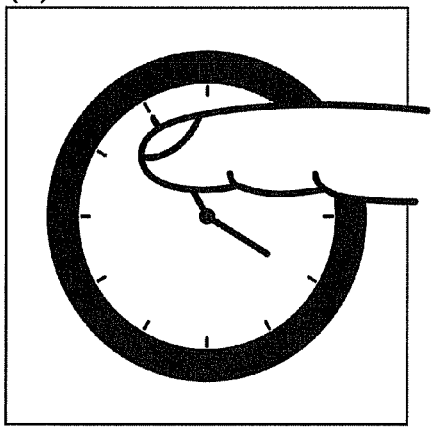
Figure 3:
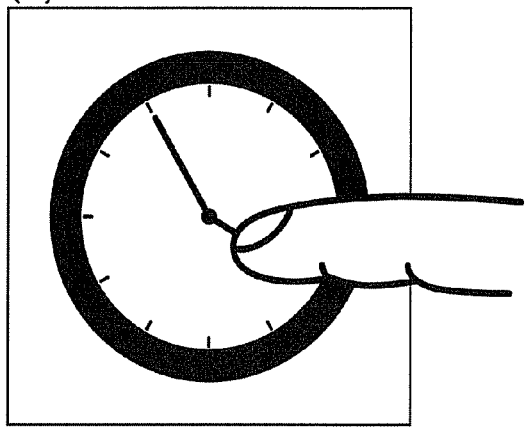
Figure 3:
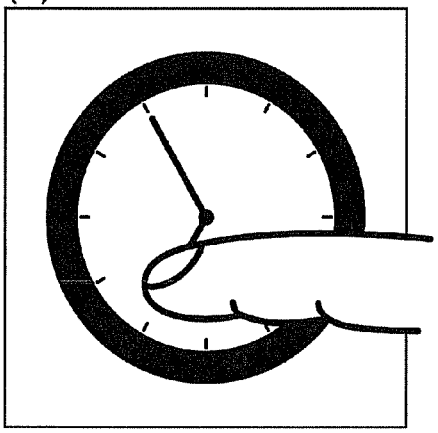
Figure 3:
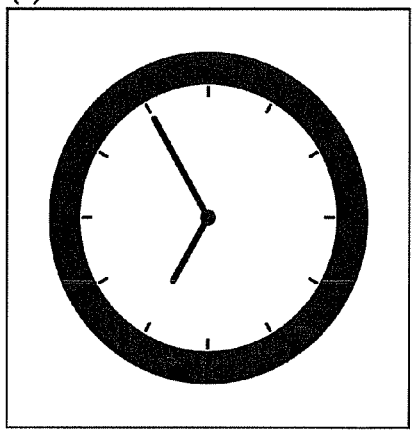

FIG. 3 sequentially shows each step of the password entry from FIG. 1 (b).

Figure 4:
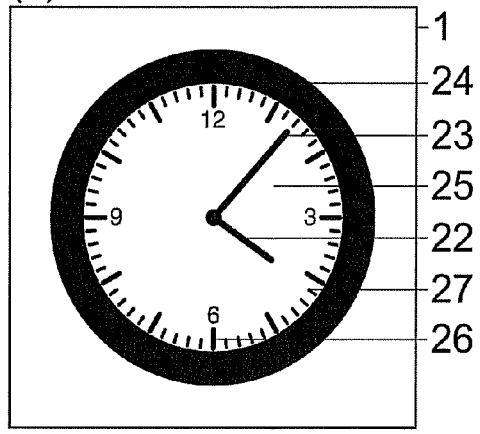
Figure 4:
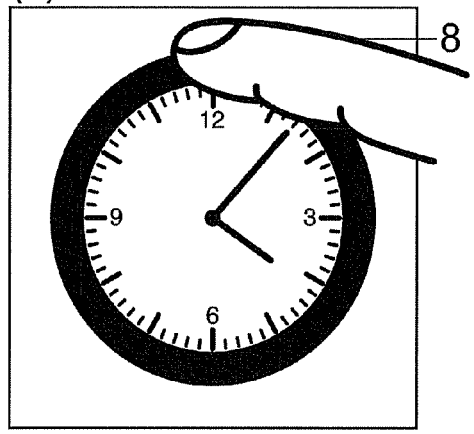
Figure 4:
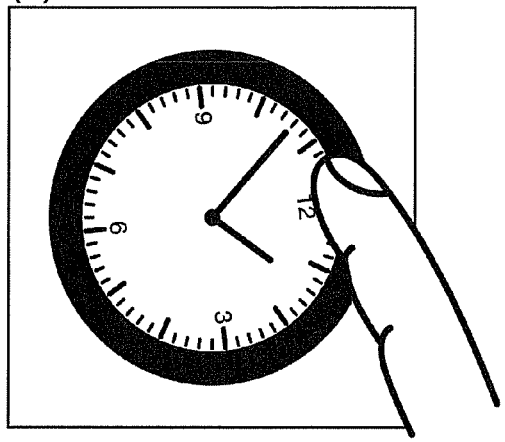
Figure 4:
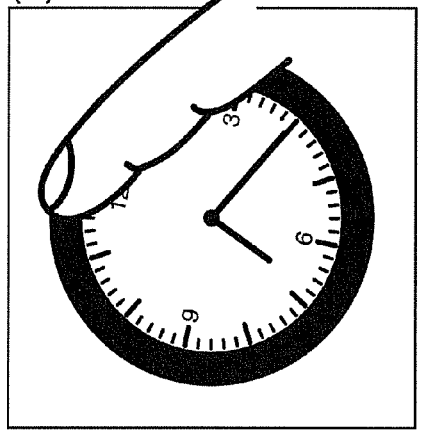
Figure 4:
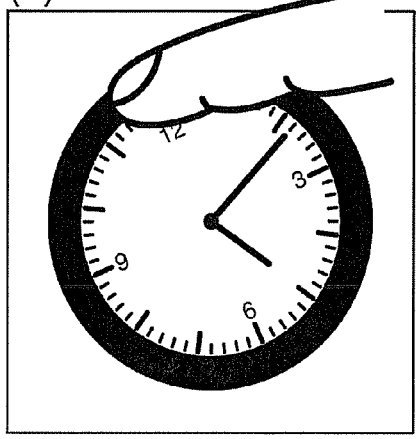
Figure 4:
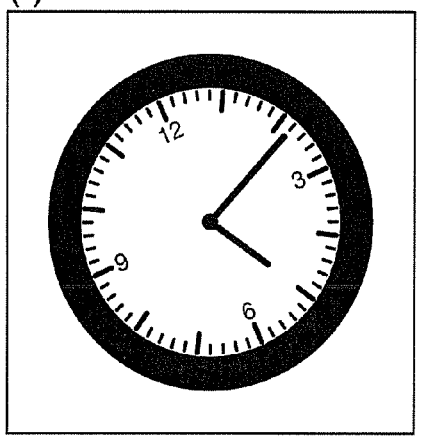

FIG. 4 sequentially shows the password input by rotating the bezel together with the dial and scale of an analog timepiece displayed on a touch screen.

Figure 5:
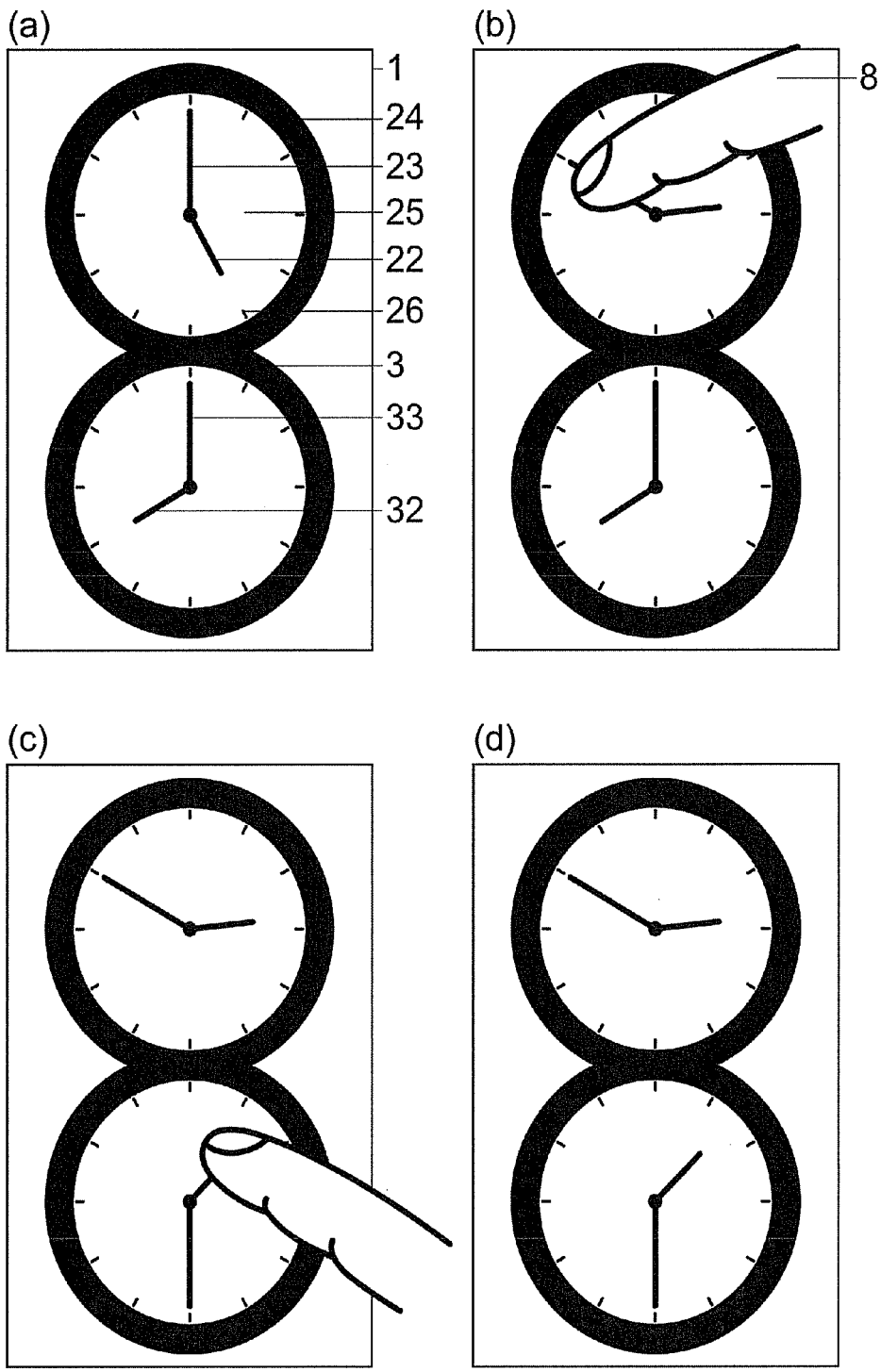

FIG. 5 sequentially shows the password input by adjusting the time on two analog timepieces displayed on a touch screen.

Figure 6:
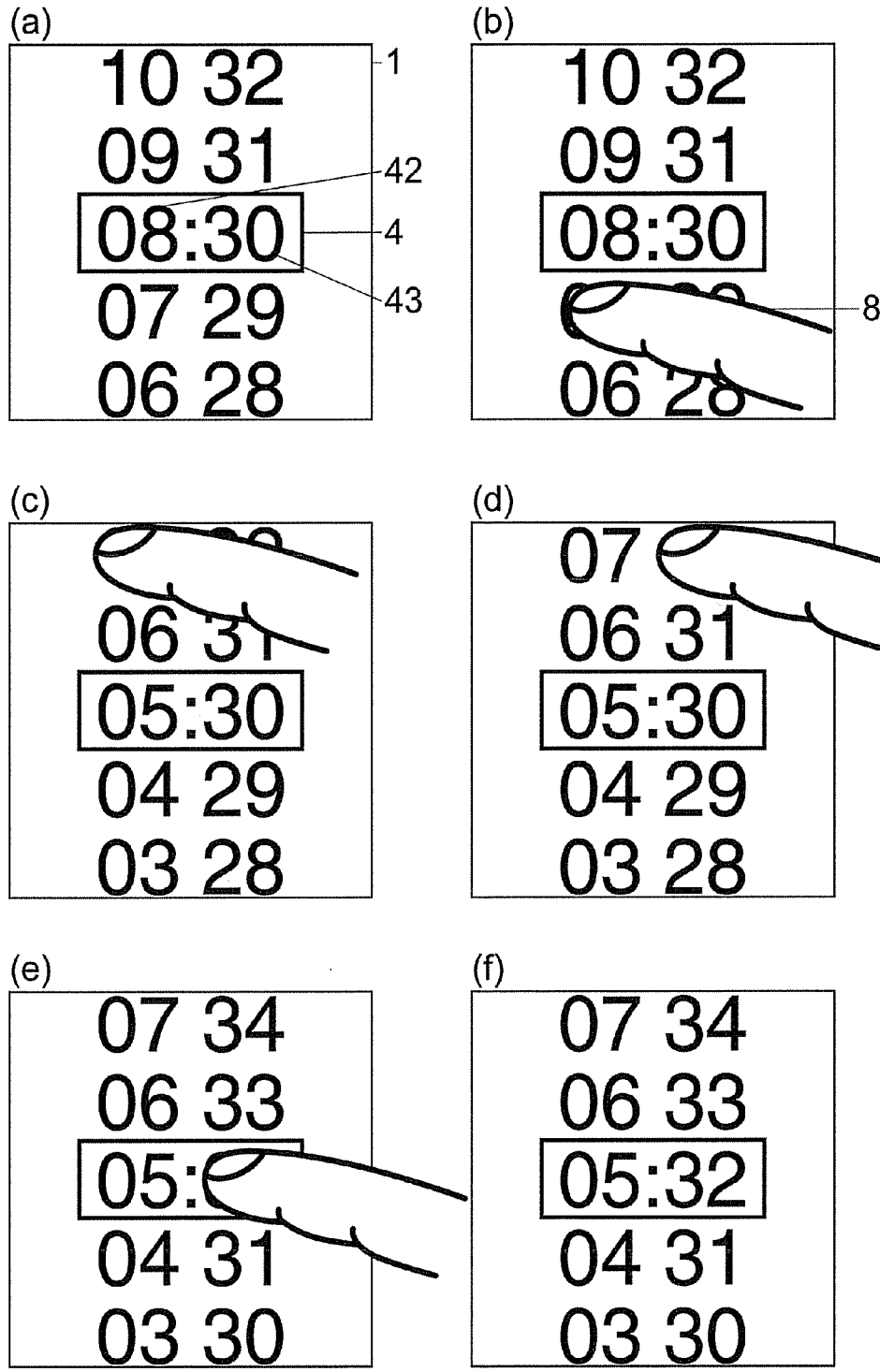

FIG. 6 sequentially shows the password input using a digital timepiece with indication of the hour and minute.

Figure 7:
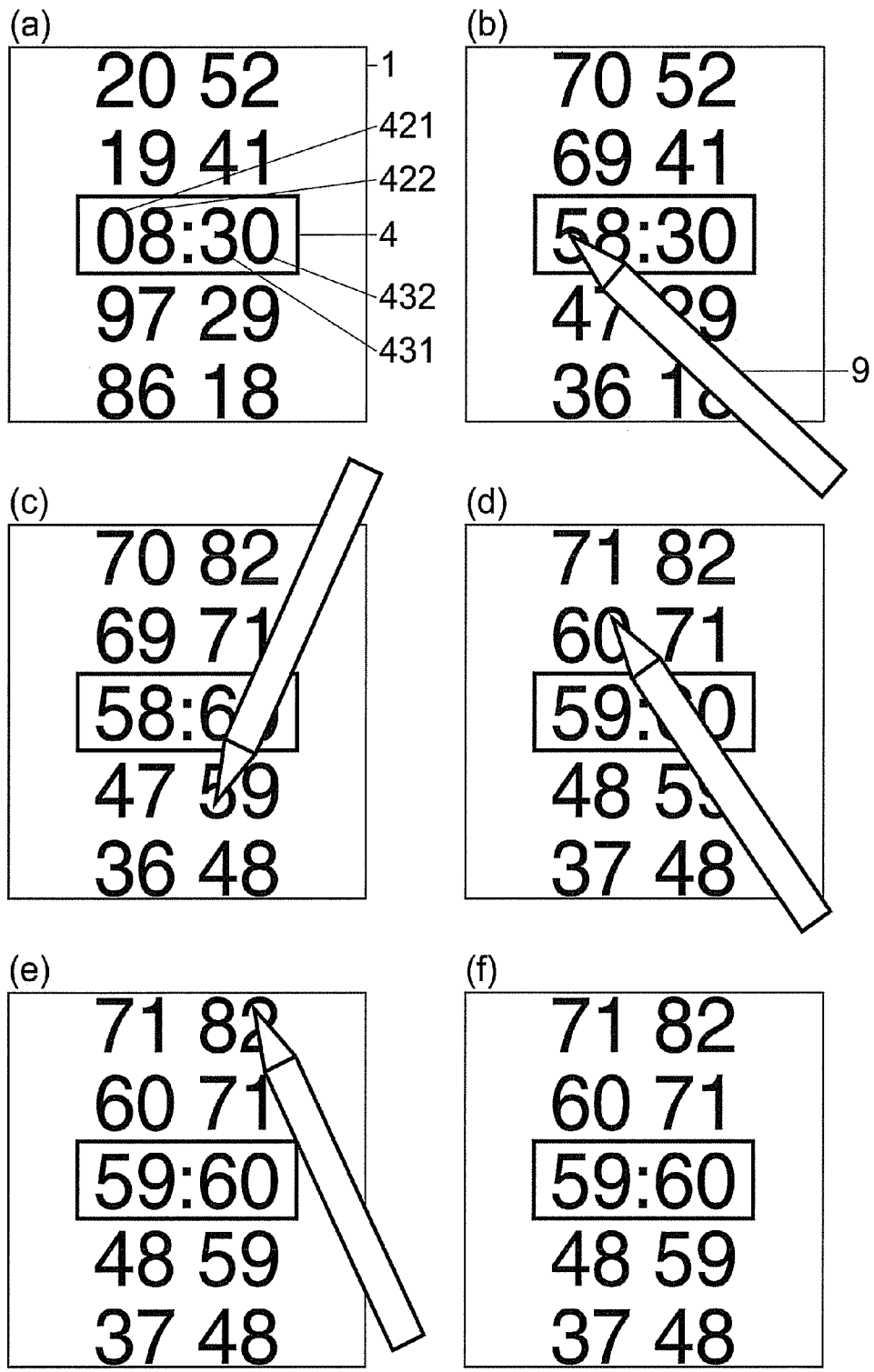

FIG. 7 shows an embodiment of the method according to the invention similar to that in FIG. 6, with the difference that in FIG. 7, every number of the digital timepiece can be set separately.

Figure 8:
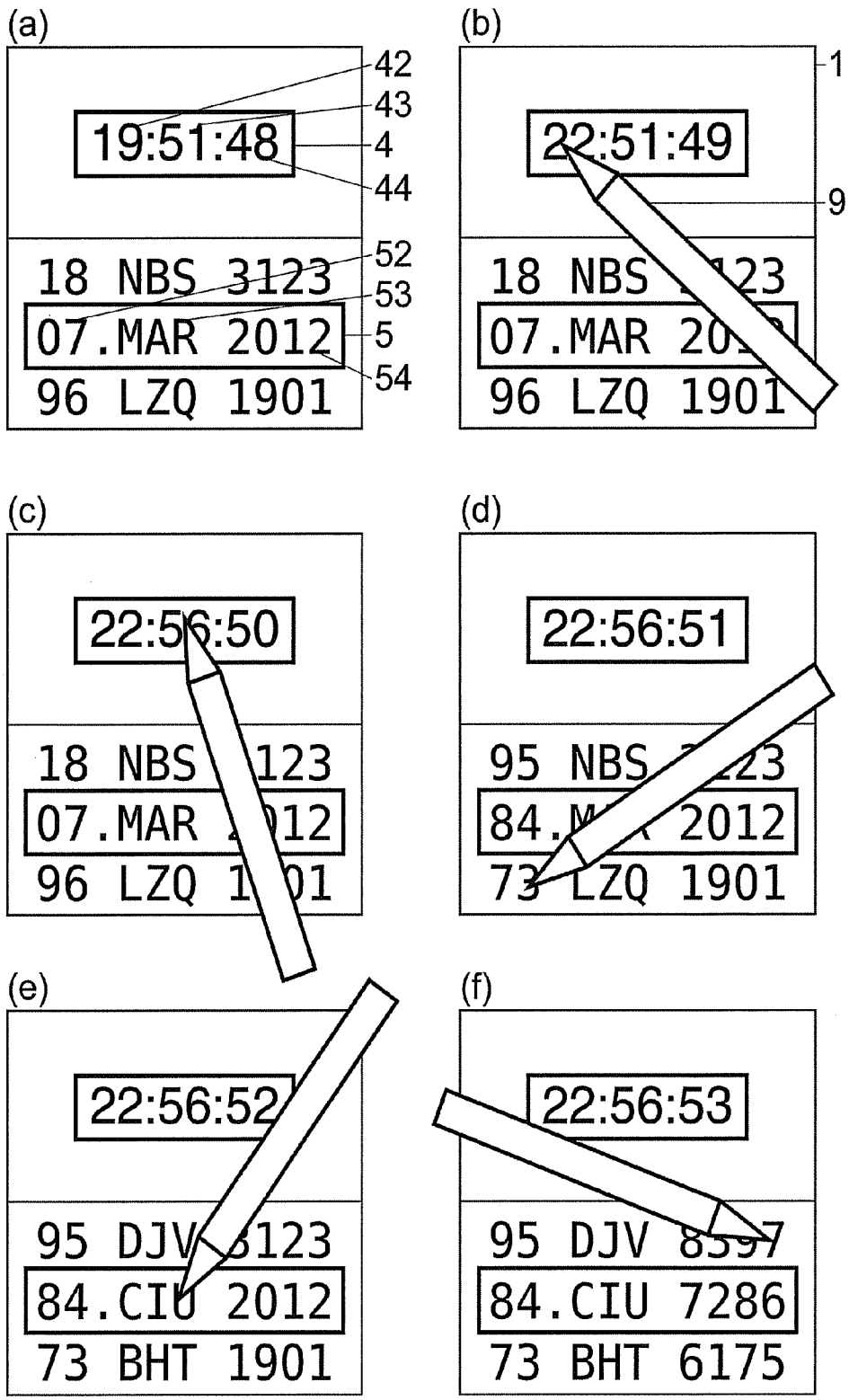

FIG. 8 sequentially shows the password input of one embodiment of the method according to the invention with a digital timepiece with hour, minute and second as well as a date display.

Figure 9:
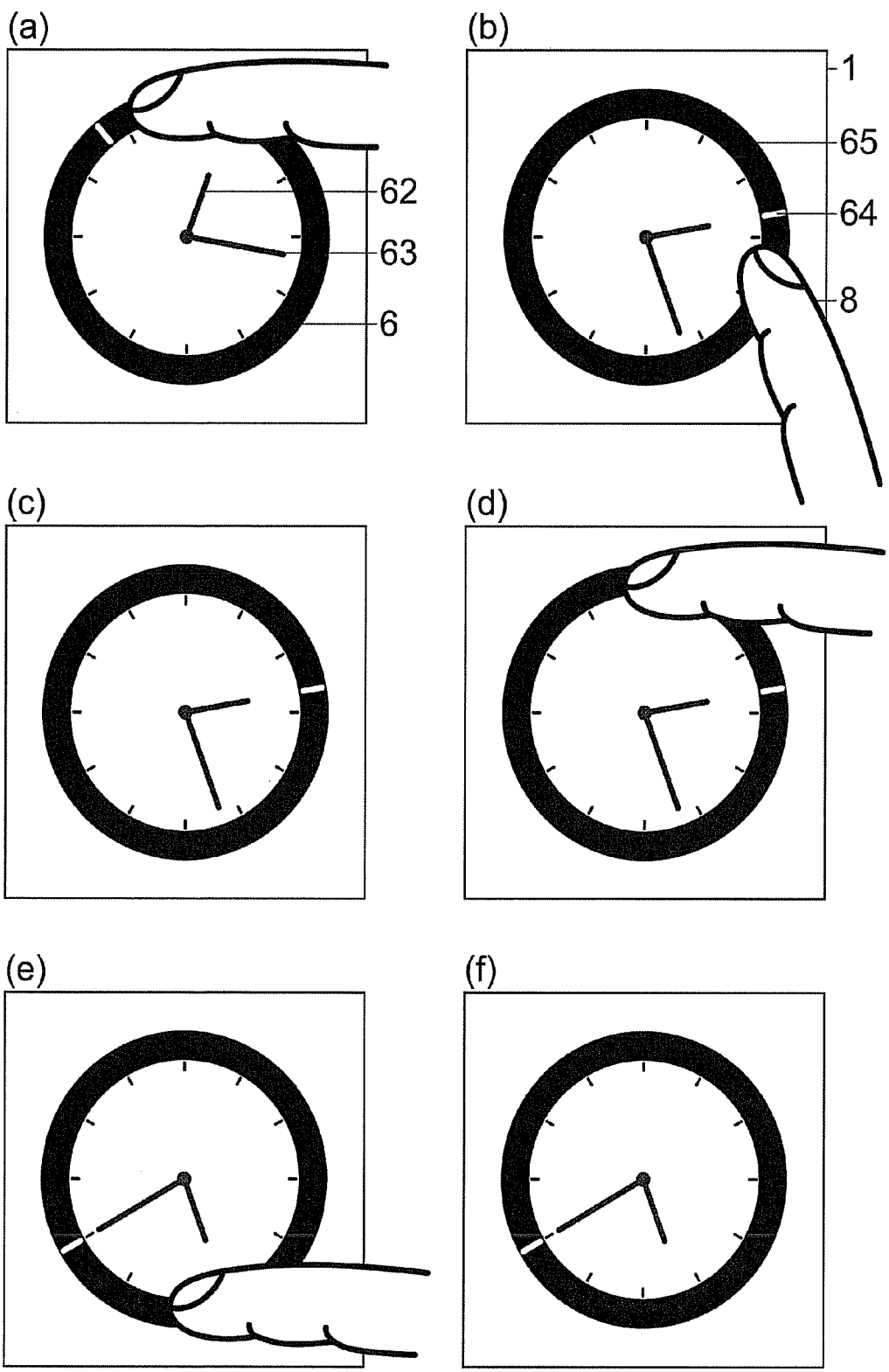

FIG. 9 shows the method according to the invention in an embodiment in combination with an interactive, analog timepiece according to patent specification DE 102 010 020 466 A1.

Figure 10:
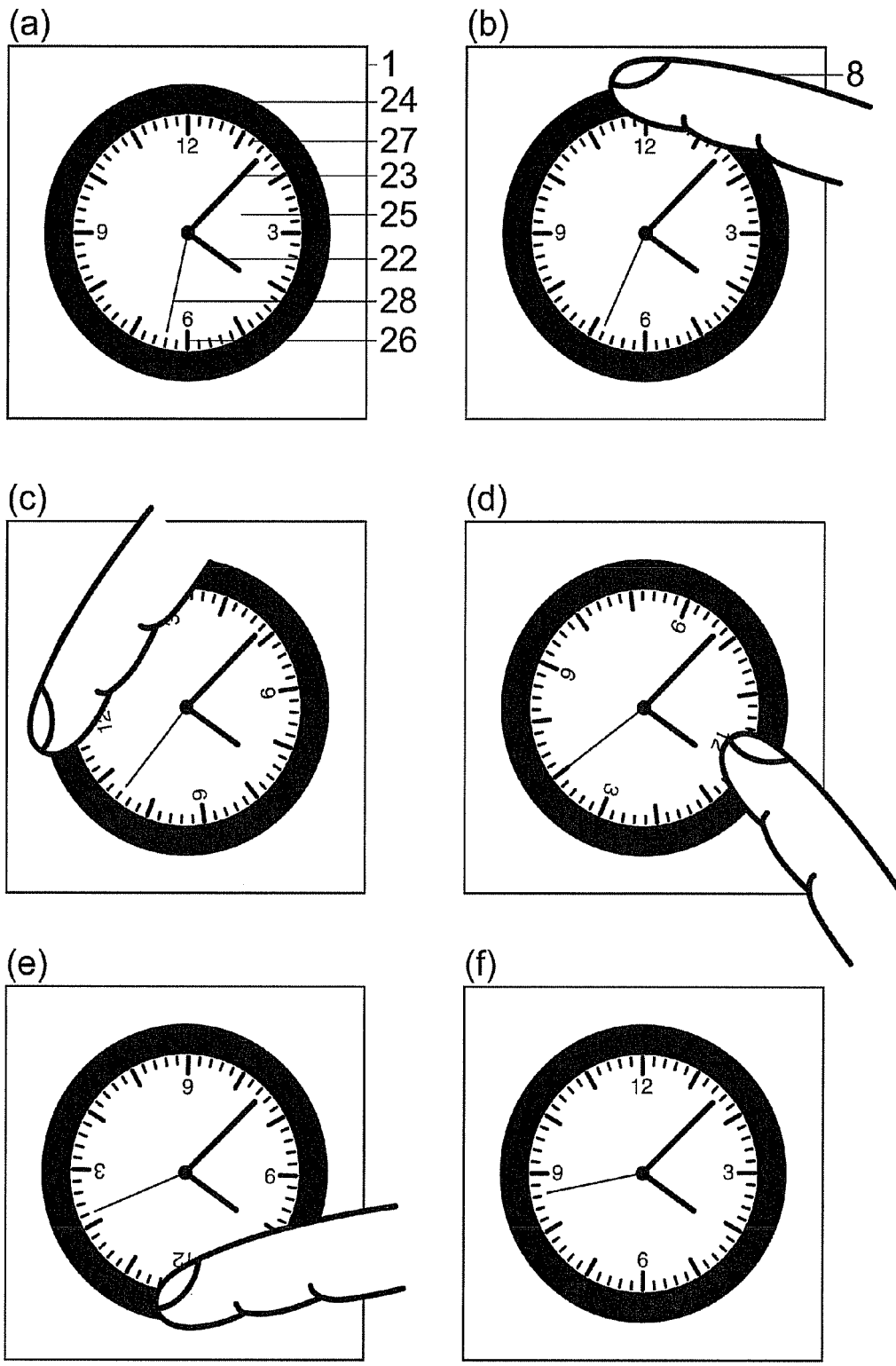

FIG. 10 shows an embodiment of the method according to the invention similar to that presented in FIG. 4 with the difference that for entering the password, the minute indices are aligned with the seconds hand.

Figure 11:
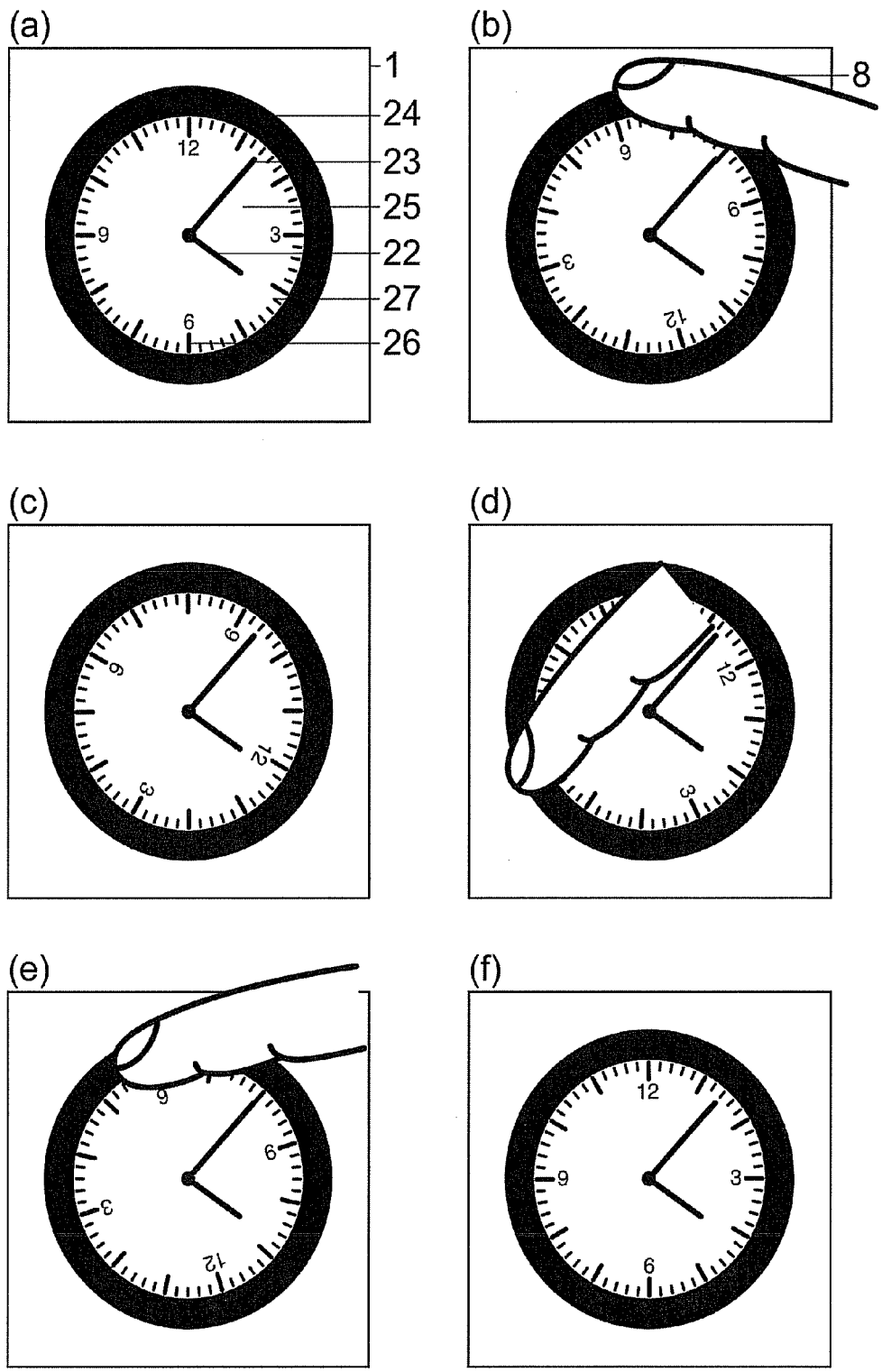

FIG. 11 sequentially shows the password input by rotating the bezel together with the dial and scale of an analog timepiece displayed on a touch screen, which resets itself to the current time after entering the password.

Figure 12:
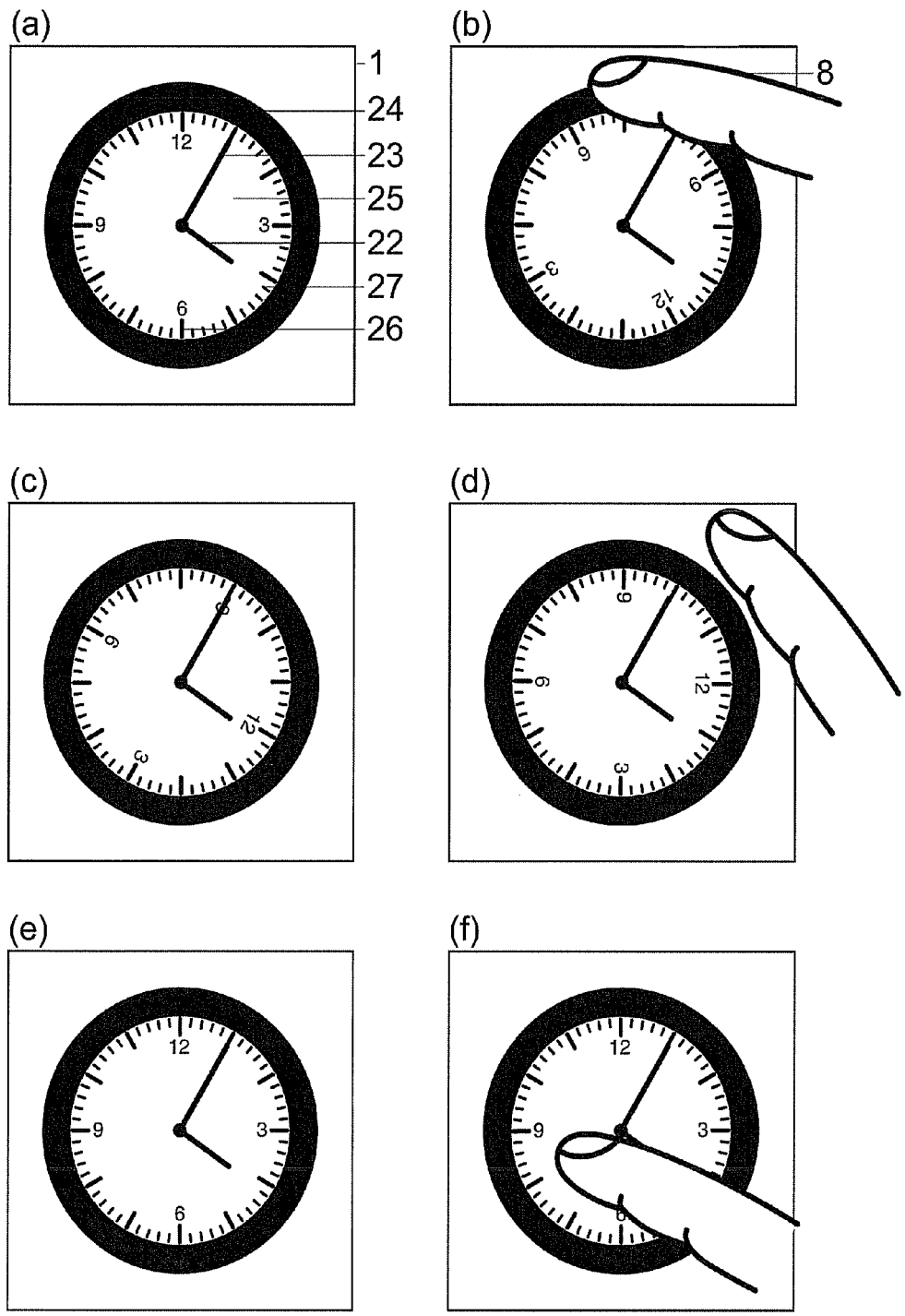

FIG. 12 sequentially shows the password input by rotating the bezel together with the dial and scale and by tapping on an analog timepiece displayed on a touch screen, which resets itself to the current time after entering the password.

Figure 13:
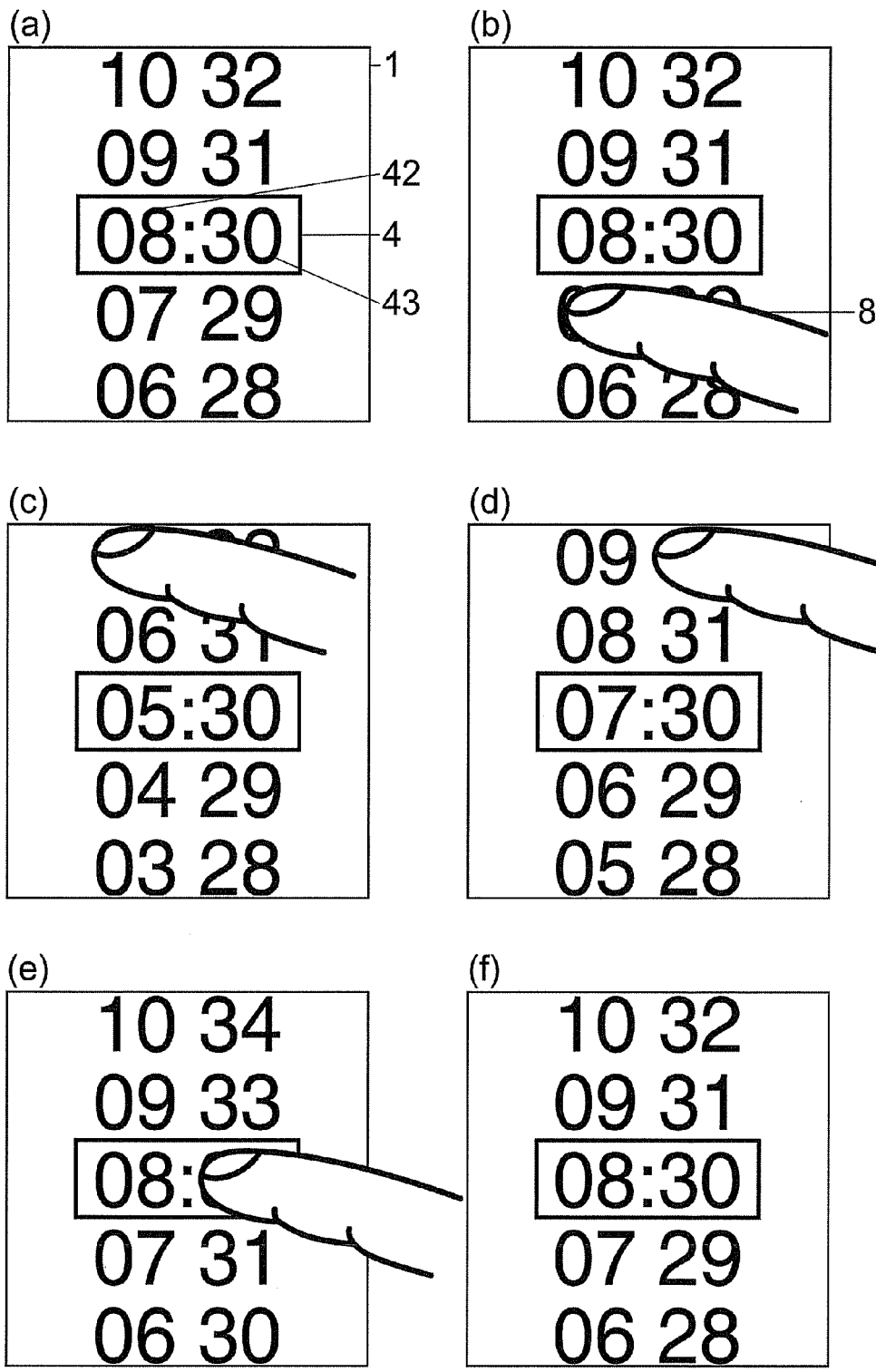

FIG. 13 shows the embodiment of FIG. 6 with the difference that the timepiece resets itself to the current time after entering the password.

Figure 14:
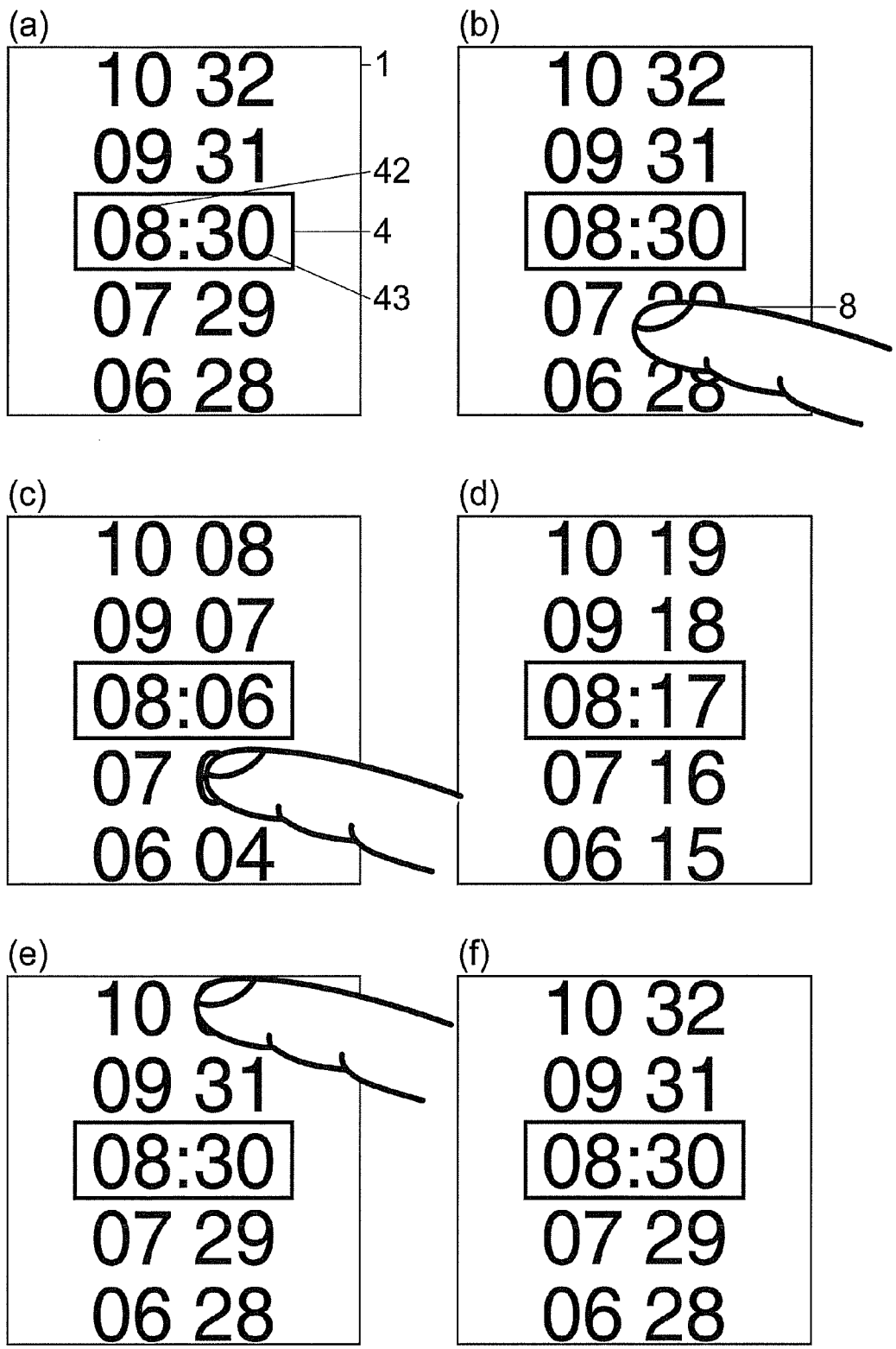

FIG. 14 shows the embodiment of FIG. 13 with the difference that the password is entered by means of the minute indication only.

Figure 15:
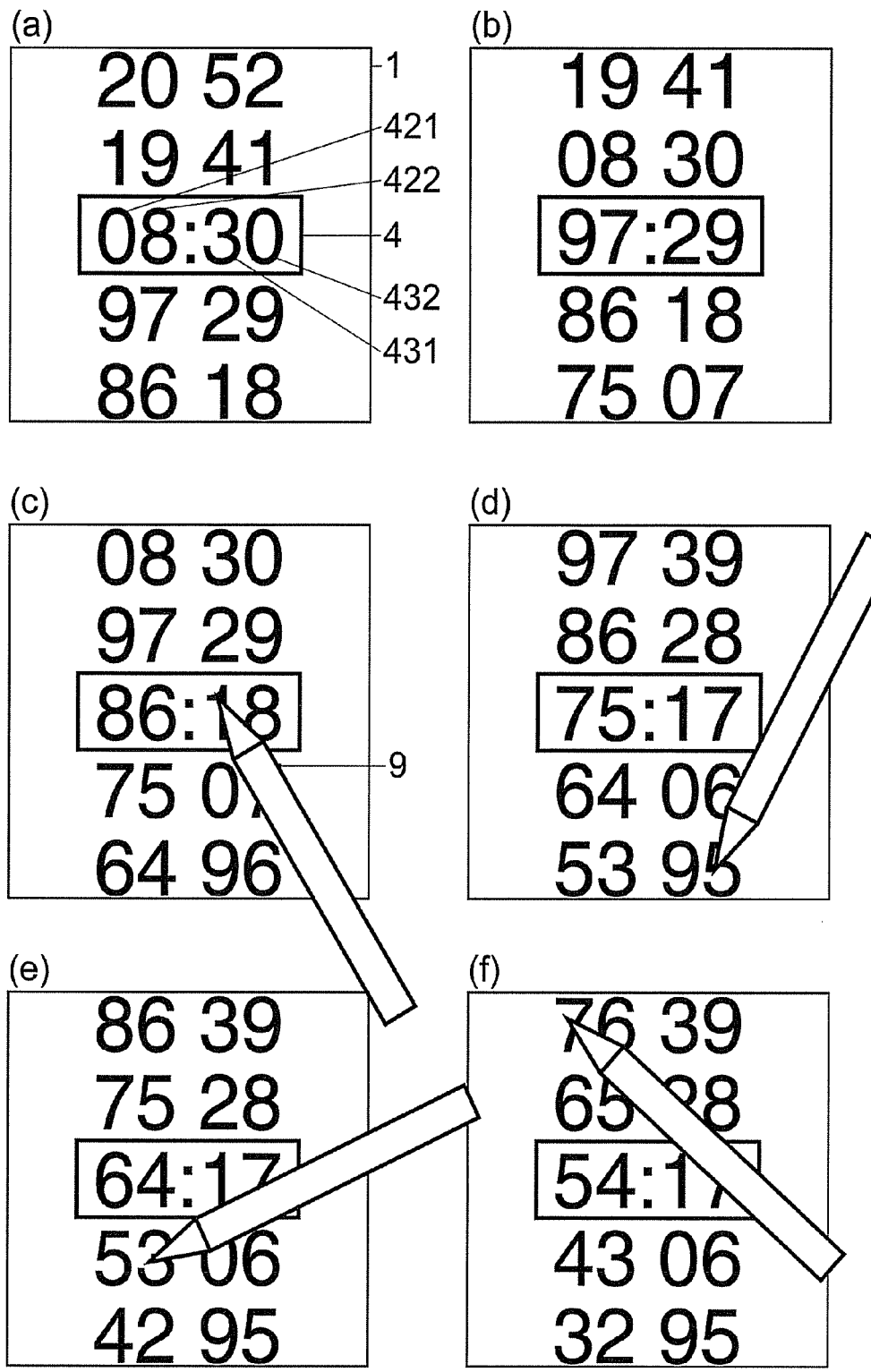

FIG. 15 sequentially shows the password input by tapping a digital timepiece displayed on a touch screen similar to the embodiment of FIG. 7 but with the difference that the elements of the timepiece move continuously for entering the password.

Figure 16:
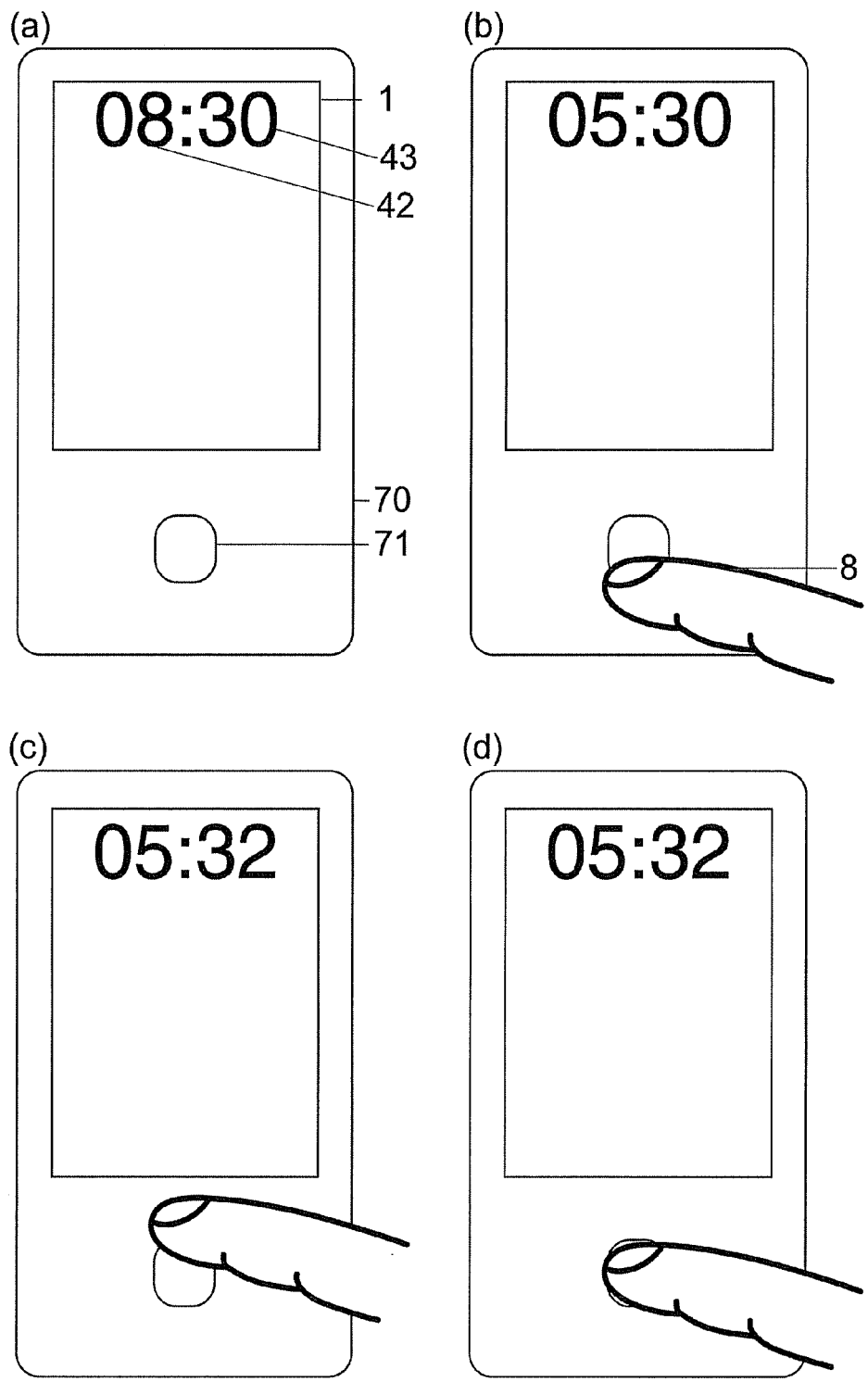

FIG. 16 sequentially shows snapshots of the password entry of an embodiment of the method according to the invention on an electronic device with a button.

Figure 17:
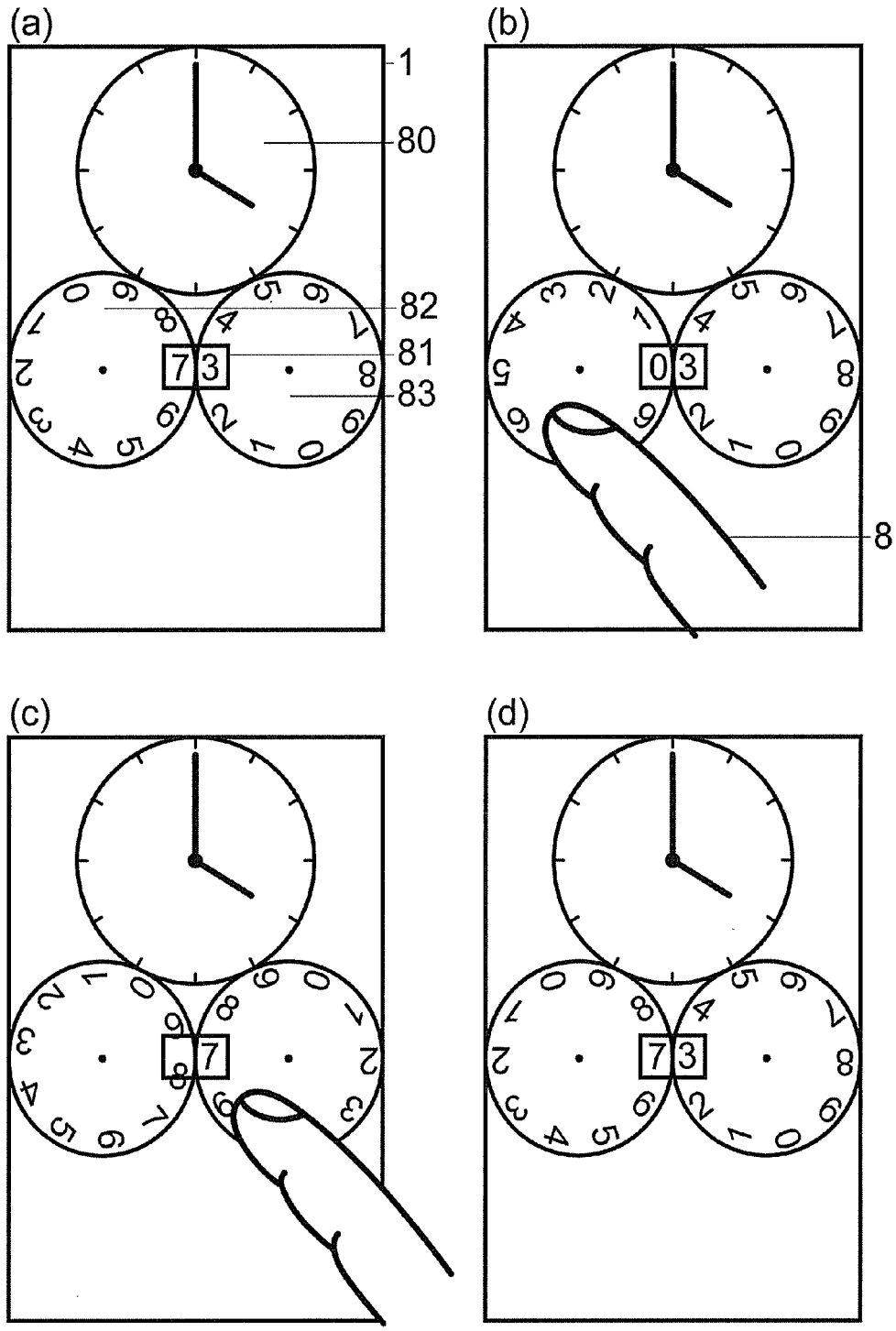

FIG. 17 sequentially shows snapshots of the password entry of an embodiment of the method according to the invention with a timepiece with power reserve indicator.

Figure 18:
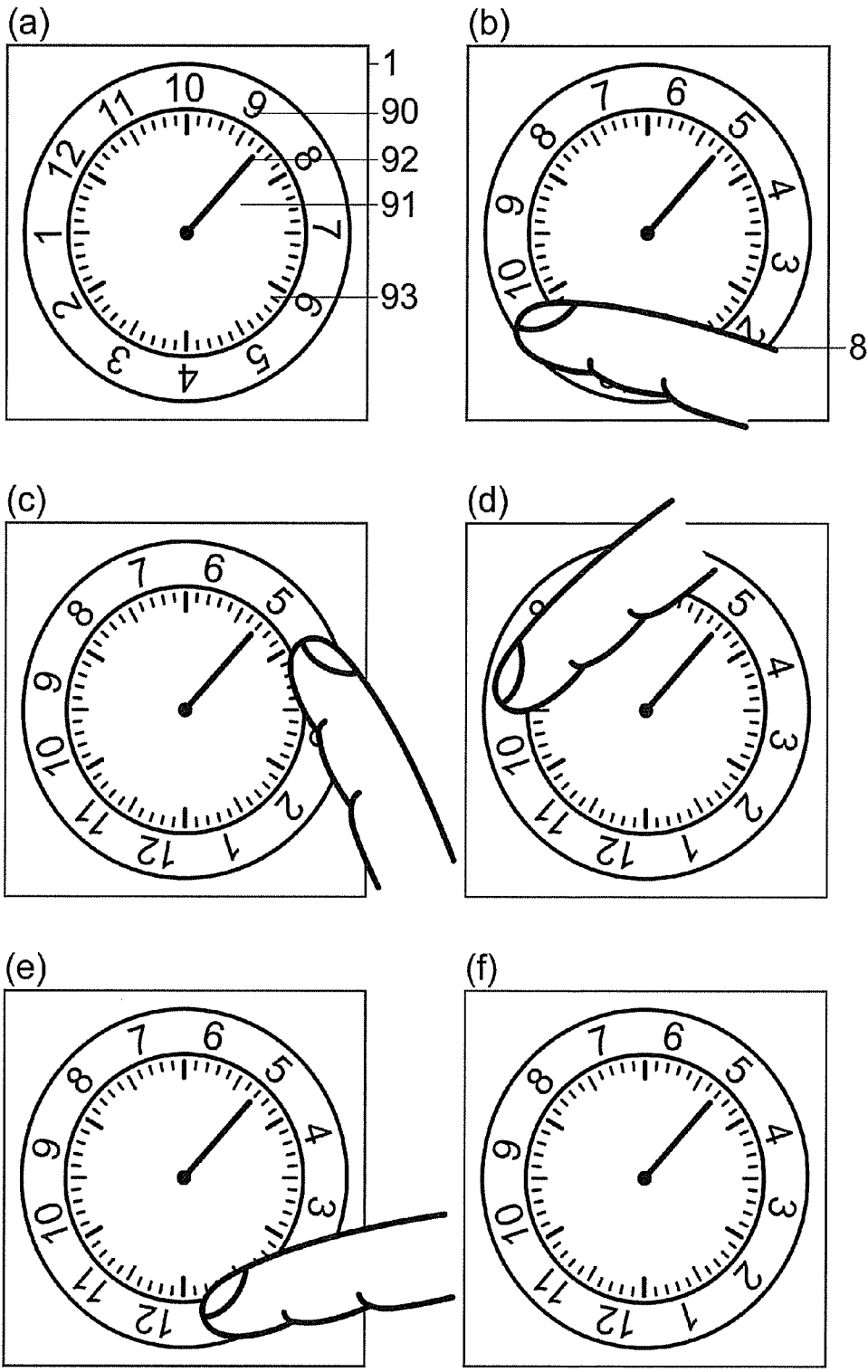

FIG. 18 sequentially shows snapshots of the password entry of an embodiment of the method according to the invention with a timepiece with analog indication of the minute and digital indication of the hour.

Figure 19:
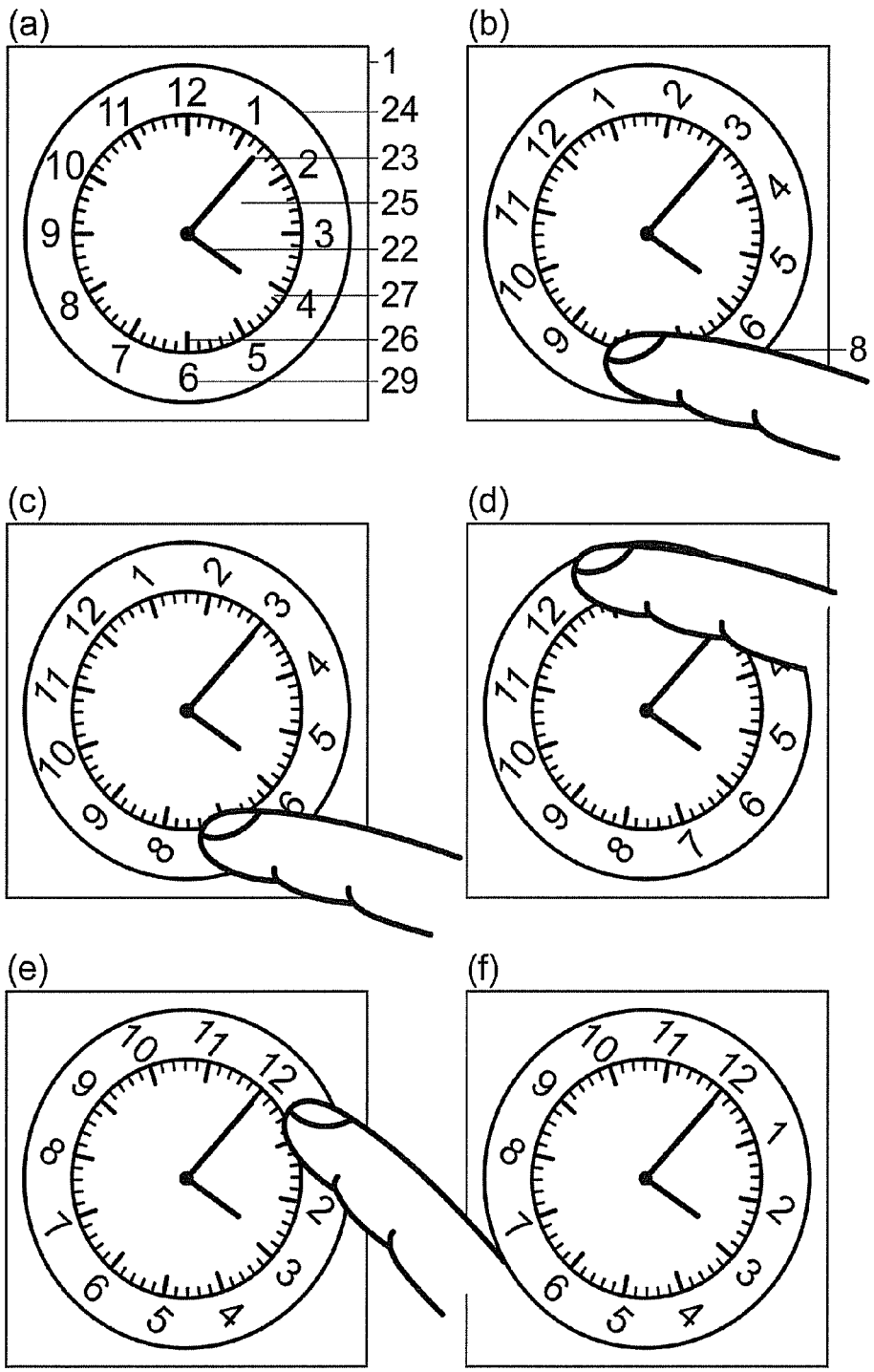

FIG. 19 sequentially shows the password input by rotating the bezel of an analog timepiece displayed on a touch screen and subsequently by tapping the numbers of the hours which correspond to the further numbers of the password.

Figure 20:
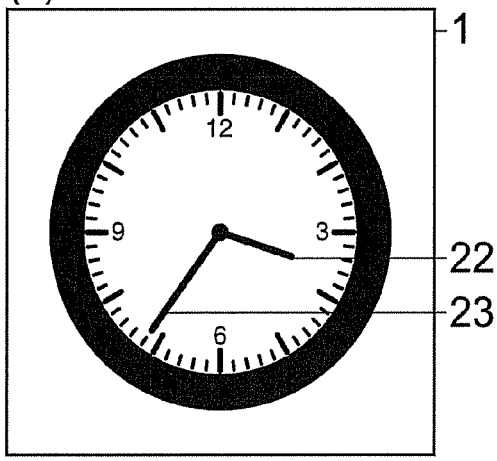
Figure 20:
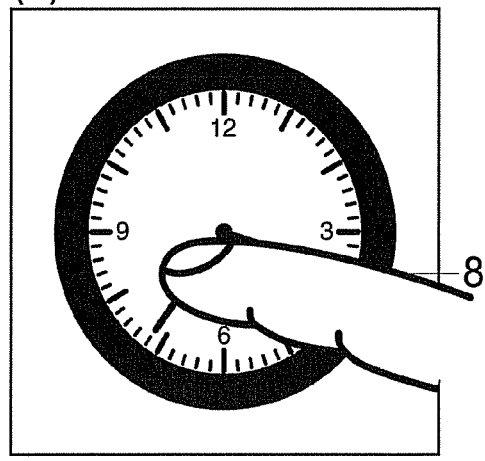
Figure 20:
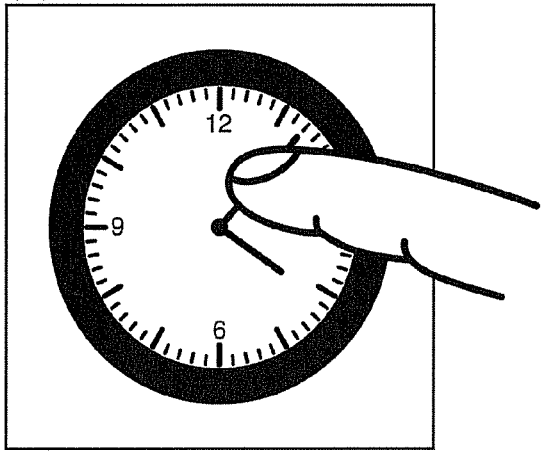
Figure 20:
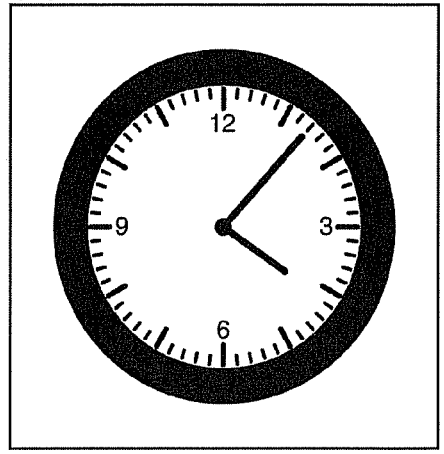

FIG. 20 shows sequences of an embodiment of the method according to the invention in which to enter the first number of the password multiple contacts with the touch screen are required, whereby the timepiece displayed on the touch screen is adjusted by means of the first contact.

In FIG. 1, the basic sequence of the method according to the invention is presented from the point of view of the user of the electronic device by means of four successive snapshots of a touch screen. FIG. 1 (*a*) shows the initial state of the method with a timepiece 2 shown on the touch screen 1 at the time 16:00 o'clock. In FIG. 1 (*b*) a contact with the touch screen 1 was made with the finger 8 of the user of the electronic device and elements of the timepiece are moved in accordance with a password entry. In FIG. 1 (*c*) the adjusted timepiece 2 is shown after the input of the password, wherein in this embodiment of the method according to the invention, the timepiece 2 displays the password required for the execution of password-protected action. Due to the correct input of the password, in FIG. 1 (*d*), the password-protected action is executed, which consists of displaying a control panel 7 on the touch screen 1, which provides access to the email inbox.

Figure 2:
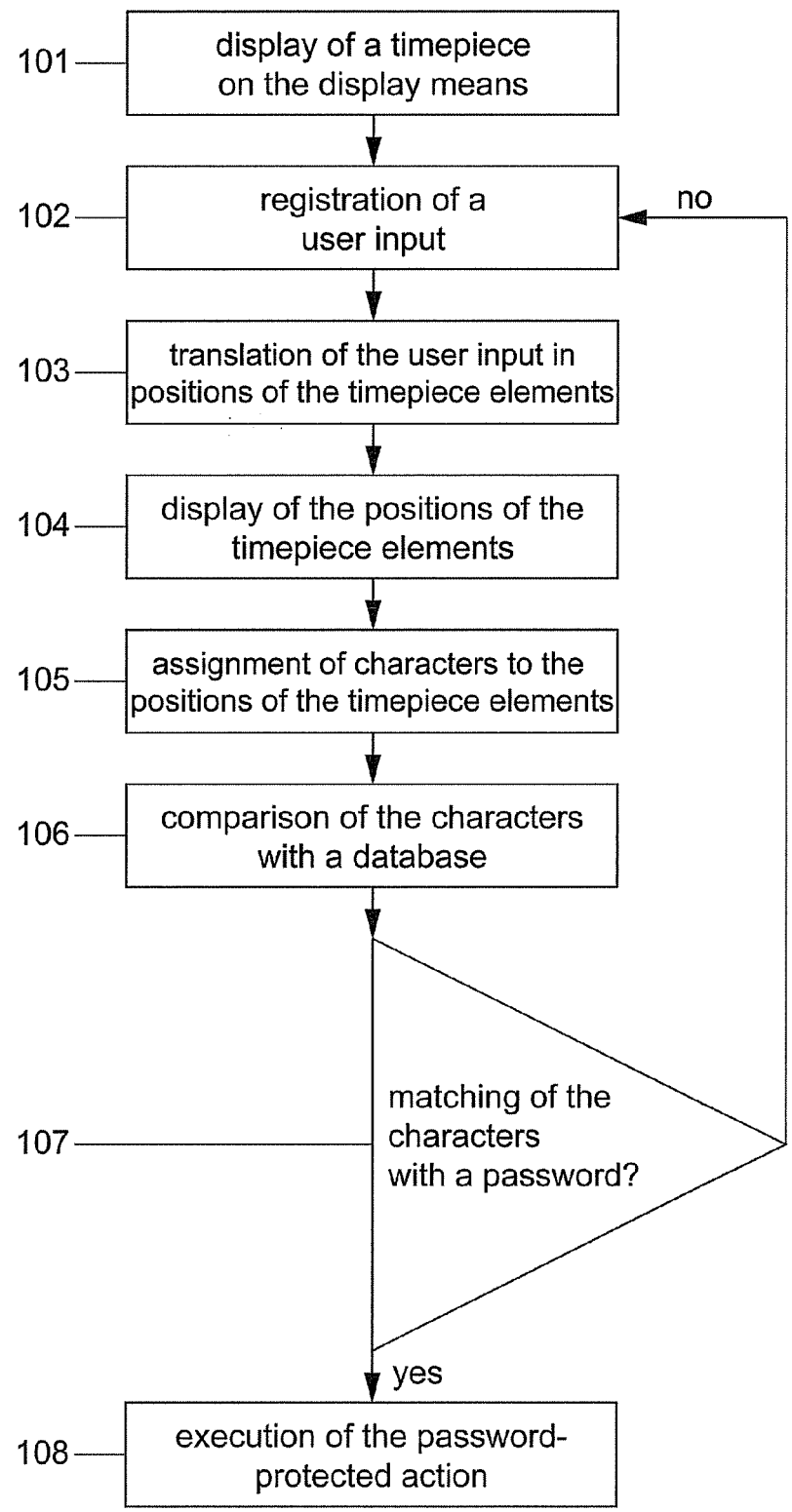
FIG. 2 shows a diagram of the processes of the method according to the invention which are executed in the data processing device.

The basic process flow of an embodiment of the method according to the invention is shown in FIG. 2 using a block diagram. The method begins with process 101, in which a timepiece is displayed on the display means. In the following process 102, a user input is registered with attributes such as position on the display device and type of user input (e.g., tapping, clicking, dragging, scrolling or brushing). In process 103, the registered user input is linked with the displayed timepiece and converted or accordingly translated into positions or accordingly representations of the timepiece elements. The thus obtained positions of the timepiece elements are shown on the touch screen in process 104 and transferred into alphanumeric characters of the password in process 105. The transfer of the positions of the timepiece elements into characters of the password in process 105 occurs depending on the settings, for example, based on the angles of the timepiece elements on a scale of an analog timepiece. In process 106, the alphanumeric characters determined in the preceding process 105 are compared with the password or the passwords stored in a database. When the alphanumeric characters match a password, process 107 leads to the execution of the action which is protected by the password in process 108. If the alphanumeric characters do not match a password from the database, process 107 leads back to process 102 to register further user inputs. By repeatedly running through the block diagram the sequentially entered alphanumeric characters of the password are registered.

In FIG. 3, the password input of FIG. 1 (*b*) is shown in detail by means of six successive snapshots. FIG. 3 (*a*) shows the touch screen 1 with an analog timepiece with a 12 hours and 60 minutes scale at the time 16 o'clock. The analog timepiece consists of the elements hour hand 22, minute hand 23, casing or accordingly bezel 24, as well as dial 25 with hour scale 26.

The settings for entering the password in the embodiment of the method according to the invention in FIG. 3 allow the adjustment of the timepiece elements hour hand 22 and minute hand 23. All other elements of the timepiece are not adjustable in this embodiment. Furthermore, the two hands 22, 23 can be adjusted independently so that, for example, the minute hand 23 is not moved during the adjustment of the hour hand 22. With both hands values are to be set on the hour scale, so that a two-digit password results with 12 possible values for each of the digits. First, the minute hand 23 is to be adjusted so that it points to the hour "11" and then the hour hand 22 is to be set to the hour "7". The password to be set in FIG. 3 thus is "11-07" with the condition that the first number is to be set with the minute hand 23 and the second number with the hour hand 22. The password-protected action is executed after correctly setting the password, and after releasing the contact with the touch screen with a defined short time delay for example of one second.

In FIG. 3 (*b*) a finger 8 of the user of the electronic device with touch screen is shown, wherein the finger 8 touches the touch screen 1 at the position of the minute hand 23. From FIG. 3 (*b*) to FIG. 3 (*c*) the finger 8 was drawn to the left with continuing contact with the touch screen, whereby the minute hand 23 is rotated in the counterclockwise direction according to the movement of the finger 8. Starting from the initial position of the minute hand 23 in FIG. 3 (*a*) and (*b*), the minute hand 23 has been adjusted backwards by 5 minutes. The position of the minute hand 23 in FIG. 3 (*c*) thus is at 55 minutes or the hour "11", respectively. From FIG. 3 (*c*) to FIG. 3 (*d*) the contact of the finger 8 with the touch screen 1 was released in order to then touch the touch screen 1 at the location of the hour hand 22. From FIG. 3 (*d*) to FIG. 3 (*e*), the finger 8 was moved so far to the left in ongoing contact with the touch screen, that the hour hand 22 points at the hour "7". In FIG. 3 (*f*) the touch screen 1 is shown with the adjusted timepiece after release of the touch of the finger 8. The password to be set "11-07" has been entered successfully, so that the password-protected action now is executed.

FIG. 4 is set up similar to FIG. 3 and sequentially shows entering a password in a further embodiment of the method according to the invention. In addition to touch screen 1, hour hand 22, minute hand 23, bezel 24, dial 25 and hour scale 26, the timepiece features a minute scale 27. In this embodiment, the elements hour hand 22 and minute hand 23 of the timepiece cannot be moved by means of a contact with the touch screen. Furthermore, bezel 24, dial 25, hour scale 26 and minute scale 27 form a composite element of the timepiece which can be rotated around the axis of rotation of the hands through contact with the touch screen.

FIG. 4 (*a*) shows the touch screen 1 with the displayed timepiece at the time 16:07 o'clock. In the following FIG. 4 (*b*) a contact with the touch screen 1 is established at the 12 o'clock position with the finger 8 of the user. From FIG. 4 (*b*) to FIG. 4 (*c*), the bezel 24 together with the dial 25 and the two scales 26, 27 are rotated clockwise by the finger 8 with continued contact with the touch screen. In FIG. 4 (*c*), the minute hand 23 points at the first number of the password on the minute scale 27. Consequently, FIG. 4 (*c*) shows the position in which the direction of rotation is reversed, so that the first number of the password is detected by the data processing means. From FIG. 4 (*c*) to FIG. 4 (*d*), the rotation occurred counter-clockwise until the minute hand 23 points at the minute "20". In FIG. 4 (*d*) a reversing of the direction of rotation is carried out again for registering the second number of the password. By means of a rotation in clockwise direction, the third and last number of the password is set in FIG. 4 (*e*) where the minute hand 23 points at the minute "11". In FIG. 4 (*f*), the finger 8 was released from the touch screen, so that the last digit of the password is assigned to the representation of the timepiece.

FIG. 5 shows an embodiment of the method according to the invention in which two analog timepieces are displayed on the touch screen. The use of two timepieces can be of benefit, for example, to display the current time in two different time zones. Alternatively, also one timepiece could be showing the time and the other could represent a stop watch or stop clock. With the timepieces shown in FIG. 5, only the respective hands 22, 23, 32, 33 are adjustable by means of a contact with the touch screen. Furthermore, the hour hands 22, 32 and minute hands 23, 33 are connected with each other in each timepiece in a way that, for a movement of one hand, the other hand moves as well in accordance with a time display.

In the embodiment of FIG. 5, the settings for entering the password were chosen so that the timepieces can be adjusted on both the hour hands 22, 32 and the minute hands 23, 33. It was also defined that it is not important for the correct input of the password, which of the timepieces is adjusted first. The password provides to set the time 14:50 o'clock in the upper timepiece and the time 13:30 o'clock in the bottom timepiece 3.

FIG. 5 (*a*) shows the initial position of the timepieces displayed on the touch screen. In FIG. 5 (*b*) the upper timepiece was set to the time corresponding to the password by means of a contact and a subsequent movement of the finger 8 with the minute hand 23. For this purpose, several counterclockwise revolutions of the minute hand 23 were necessary. In FIG. 5 (*c*), then the lower timepiece 3 was adjusted by means of the hour hand 32, so that the times corresponding to the password are displayed in FIG. 5 (*d*) and the password is fully entered.

In the embodiment of the method according to the invention in FIG. 6, a digital timepiece is displayed on the touch screen 1, wherein all numbers and lines on the screen belong to the digital timepiece. The digital timepiece features an hour number ray 42 and a minute number ray 43. In addition to the current time in the middle, the two rays 42 and 43 show the two already past values below and the two values of the display to come above. The frame 4 in the middle of the screen 1 frames the numbers of the rays 42 and 43 corresponding to the current time. In FIG. 6 (*a*), hence, the time 8:30 o'clock is displayed. The numbers of the hour number ray 42 and the minute number ray 43 move downward with progressing time, so that numbers previously visible above the frame 4 are successively displayed in the frame. With the hour number ray 42 the change of numbers in each case occurs every full hour and with the minute number ray 43 accordingly the change occurs every full minute.

The settings for password entry for the embodiment of the method according to the invention shown in FIG. 6 allow a scrolling through the numbers of hour number ray 42 and the minute number ray 43. The password to be set equals the time 5:32 o'clock, where it is not important which of the two numbers is set first. To prevent an automatic password entry at the time 5:32 o'clock, it is required to move both the hour and the minute by means of a contact with the touch screen.

FIG. 6 (*a*) shows the touch screen 1 with the digital timepiece at the time 8:30 o'clock before entering the password. In FIG. 6 (*b*), a contact with the touch screen 1 is established with the finger 8 on the number ray of the hour 42. From FIG. 6 (*b*) to FIG. 6 (*c*), the number ray of the hour 42 has been moved upwards, so that the hour "5" is displayed in the frame 4. From FIG. 6 (*c*) to FIG. 6 (*d*), the finger 8 is released from the touch screen 1 to establish a contact with the minute number ray 43. From FIG. 6 (*d*) to FIG. 6 (*e*), the number ray of the minute 43 was moved down so that the corresponding number of the password is displayed in the frame 4, see FIG. 6 (*f*).

A modification of the embodiment from FIG. 6 is shown in FIG. 7, where the primary difference is to be found in the hour number ray 42 and the minute number ray 43 of the digital timepiece. In the embodiment in FIG. 7, the current hour is indicated by means of individual number rays 421 and 422 and the current minute is indicated by means of individual number rays 431 and 432. The number ray 421 moves down one value every ten hours, the number ray 422 every hour, the number ray 431 every ten minutes and the number ray 432 moves down one value every full minute. To enter a password, all four number rays 421, 422, 431, 432 are to be set separately. The password to be set is "59:60" and for a correct password entry a certain chronological order of entry is required. First, the number ray 421 is to be set, followed by the number rays 431 and 422, and the number ray 432 at the end.

FIG. 7 (*a*) shows the touch screen 1 with the digital timepiece at the time 8:30 o'clock. By means a stylus 9 intended for this purpose, in FIG. 7 (*b*), a contact is established with the touch screen and the number ray 421 is set to the position corresponding to the password. For this purpose, multiple contacts can be established with the touch screen 1. Alternatively, the number ray 421 can be set in motion by means of a swiping and then brought to a halt at the correct position by a tapping. In FIG. 7 (*c*) the number ray 431 is set accordingly, followed by the number rays 422 in FIG. 7 (*d*) and the number ray 432 in FIG. 7 (*e*). FIG. 7 (*f*) shows the touch screen 1 with the correctly set digital timepiece, so that the password-protected action now can be executed.

FIG. 8 shows a further embodiment of the method according to the invention for entering a password on a digital timepiece with date indicator 5. The digital timepiece features an hour display 42, a minute display 43 and seconds display 44. In contrast to the digital timepieces in FIGS. 6 and 7, the past and future numbers of the display are not visible in the version in FIG. 8, so scrolling through the values of the display is not provided. The date display 5 consists of the day display 52 in the form of a two digit number ray, the month display 53 by means of a ray with each of the first three letters of the month, and a year display 54 by means of four rays of numbers. In the date display 5 again the numbers and letters are shown below and above the date display 5, so that a scrolling through the different values is visible.

The embodiment in FIG. 8 features a number of settings to enter a password. The hour display 42, the minute display 43 and the seconds display 44 of the digital timepiece 4 can each be increased by one value by tapping on it. In this embodiment, the set password provides to advance the hour display 42 by three hours and the minute display 43 by five minutes. The value of the seconds display 44 on the other hand should correspond to the current second. Similarly to the digital timepiece 4 in FIG. 7, each digit of the day display 52, month display 53 and year display 54 can be adjusted in the date display 5. Here the combination "84 CIU 7286" is to be set.

FIG. 8 (*a*) shows the touch screen 1 with the digital timepiece 4 at the time 19:51:48 o'clock and the date display 5 with the date 7.3.2012. By means of a stylus 9 dedicated for operation of the touch screen 1, the hour display 42 was tapped three times in FIG. 8 (*b*), so that the value of the hour display 42 was increased by three hours. In the following FIG. 8 (*c*) the minute display 43 was briefly touched five times with the stylus 9, so that the value of the minute display 43 was increased by five minutes. FIG. 8 (*d*) shows the touch screen 1 after the two digits of the day display 52 were adjusted by swiping and dragging the stylus 9, followed by the setting of the three letters of the month display 53 in FIG. 8 (*d*) and the setting of the four digits of the year display 54 in FIG. 8 (*e*). The fully set password is then seen in FIG. 8 (*f*), where the display of the digital timepiece 4 continuous to run continuously.

An embodiment of the method according to the invention with an interactive, analog timepiece 6 according to patent specification DE 10 2010 020 466 A1 is shown in FIG. 9. The timepiece 6 features an hour hand 62 and a minute hand 63, as well as a mark 64 on the bezel 65. The reading of the time is effected here by the rotation of the bezel 65, which results in a rotation of the hour hand 62 and minute hand 63, wherein the two hands 62, 63 rotate half as wide as the bezel 65. The current hour is obtained from the angular position at which the hour hand 62 coincides with the mark 64 on the bezel 65. Similarly, the current minute is obtained from the angular position at which the minute hand 63 coincides with the mark 64 on the bezel 65. The initial position of the bezel before entering the password can be randomly determined by the data processing device, so that with each new password entry a different position of the bezel is displayed. Alternatively, the position of the bezel can be used, in which the bezel has been left at the last user input.

In the embodiment of the method according to the invention in FIG. 9 it is provided to use to reading of the current time as password input. The registration of a correct reading of the time is triggered by the release of the contact with the touch screen at the angular positions at which the hands 62, 63 coincide with the mark 64 on the bezel 65. The position where the contact of the touch screen meets the bezel 65 is not important for a proper execution of the password input. In the settings of the present embodiment it is also not important whether the hour or the minute is read at first.

FIG. 9 (*a*) shows the touch screen 1 with the interactive, analog timepiece 6 and the finger 8 of the user which touches the touch screen 1 on the bezel 65 of the timepiece 6. From FIG. 9 (*a*) to FIG. 9 (*b*), the bezel 65 has been rotated clockwise so that the mark 64 on the bezel 65 coincides with the hour hand 62. In FIG. 9 (*c*) the finger 8 was released from the touch screen 1, so that the current hour is registered, which is 2 o'clock. In FIG. 9 (*d*) the contact with the touch screen 1 was resumed on the bezel 65 and the bezel 65 is rotated clockwise to the position shown in FIG. 9 (*e*). In FIG. 9 (*e*) the mark 64 on the bezel 65 of the timepiece 6 coincides with the minute hand 63, such that in combination with the hour already read the time 2:40 o'clock is obtained. In FIG. 9 (*f*) the touch of the finger 8 was released from the touch screen 1 so that the adjusted angular position of the timepiece 6 is registered. Since the two registered positions of the bezel 65 correspond to the current time, the password-protected action can now be executed.

In the embodiment in FIG. 9 elements of the timepiece can be moved without adjusting the time to be displayed by the timepiece. This is due to the interactive nature of the analog display. At such an interactive, analog timepiece, a numeric password can also be entered that does not match the current time. For example, the minute hand can be set to different numbers of the password on the minute scale without having to consider the positions of the bezel or the hour hand. A combination of defined numbers and the values of the current time can also be used as password, so that for example the third digit of the password corresponds to the current minute.

In FIGS. 10 to 13 embodiments of the method according to the invention are described which use a resetting of the timepiece to the current time in different ways after entering the password.

FIG. 10 sequentially shows the password entry of an embodiment of the method according to the invention which is almost identical to the embodiment shown in FIG. 4. In addition to touch screen 1, hour hand 22, minute hand 23, bezel 24, dial 25, hour scale 26 and minute scale 27 the displayed timepiece features a seconds hand 28. The elements hour hand 22, minute hand 23 and seconds hand 28 of the timepiece are not movable by means of a contact with the touch screen. Furthermore, bezel 24, dial 25, hour scale 26 and minute scale 27 form a composite element of the timepiece which can be rotated around the axis of rotation of the hands by means of a contact with the touch screen. In FIG. 10, the password "53-20-11" is entered by rotating the minute scale by matching the corresponding minute indexes with the seconds hand.

In FIG. 10 (*a*) the initial position of the timepiece is shown on the touch screen. In FIG. 10 (*b*) a contact is established with the touch screen using a finger 8 and the bezel is rotated counterclockwise so that the seconds hand points at the number "53" on the minute scale, see FIG. 10 (*c*). Subsequently, the bezel is rotated clockwise, so that the reversal of the direction of rotation leads to the registration of the first number of the password. In the same way, the second number "20" of the password is entered in FIG. 10 (*d*). The third number "11" of the password is registered in FIG. 10 (*e*) by releasing the contact from the touch screen at the corresponding angle of the bezel relative to the seconds hand. After releasing the contact of the finger with the touch screen the bezel rotates back to its original position so that the current time is shown again in FIG. 10 (*f*).

While entering the password in FIG. 10, the hands of the timepiece continue their rotation according to the current time. This can clearly be seen on the seconds hand, although the password entry only takes a few seconds. Approximately 11 seconds have passed between FIG. 10 (*a*) and FIG. 10 (*f*). In addition to the time at the password input, the smudges generated on the touch screen by the password input also depend on the duration of the password input. The smudges on the touch screen are thus different if the same password is once entered quickly and once entered slowly at the same time. Thus, the exact time in seconds for the entry of each number of the password would be necessary for a correct determination of the password based on the smudges on the screen.

FIG. 11 sequentially shows snapshots during the password entry of an embodiment of the method according to the invention with an analog timepiece displayed on the touch screen 1, consisting of hour hand 22, minute hand 23, bezel 24, dial 25, hour scale 26 and minute scale 27. The elements hour hand 22 and minute hand 23 of the timepiece are movable by contact with the touch screen. Furthermore, bezel 24, dial 25, hour scale 26 and minute scale 27 form a composite element of the timepiece, which can be rotated around the axis of rotation of the hands by means of a contact with the touch screen. In FIG. 11, the number "8" is entered twice by rotating the bezel by matching the corresponding hour index with the minute hand. Here, the two numbers to be entered can represent the whole password or only a part of the password. Therefore, more numbers can be entered for a longer password before as well as after the snapshots shown in FIG. 11. In the present embodiment, it is provided that a release of the contact with the touch screen causes the registration of the number of the password.

In the embodiment in FIG. 11, the bezel of the timepiece together with the hour scale and minute scale resets to its original position after release of the contact with the touch screen. The initial position of the timepiece is shown in FIG. 11 (*a*). In FIG. 11 (*b*) the bezel was rotated by means of a contact with the touch screen 8 by a finger so that the index of the hour "8" coincides with the minute hand. Between FIG. 11 (*b*) and FIG. 11 (*c*), the contact was released from the touch screen, whereby the number "8" of the password is registered and the bezel with the scale now starts to move back into the initial position. A snapshot during the return movement of the bezel is illustrated in FIG. 11 (*c*). In another snapshot of the return movement in FIG. 11 (*d*) a contact with the touch screen has been established again, through which the return movement of the bezel is stopped. As shown in FIG. 11 (*d*), the contact with the touch screen was established before the bezel could fully move back to its initial position. Between FIG. 11 (*d*) and FIG. 11 (*e*), the bezel has been rotated clockwise, such that the index of the hour "8" matches the minute hand again, see FIG. 11 (*e*). By releasing the contact, the number "8" is registered as part of the password and the bezel begins to move back to its initial position. In FIG. 11 (*f*), the bezel has moved back completely to its initial position.

In the embodiment of FIG. 11, the same number is entered twice by means of the method according to the invention. However, the smudges left behind on the touch screen differ significantly. For the input of the first number, the bezel was rotated by an angle of approximately 180 degrees in clockwise direction. For the input of the second number, however, the bezel was only rotated by an angle of approximately 90 degrees in clockwise direction. The considerably smaller angle of rotation at the input of the second number is due to the fact that the bezel has not completely moved back to its initial position at the start of the input of the second number. To identify the first number entered on the basis of the smudges left behind on the touch screen only the current minute must be known at the time of entry. Due to the fact that the input of the second number took place during the return movement of the bezel, an identification of the second number entered based on the smudges left on the touch screen was further hampered.

It is provided that the speed at which the timepiece from the embodiment of FIG. 11 resets to the initial position is so slow that the user has enough time to touch the screen for entering the next part of the password before the timepiece has reached its initial position. This is necessary so that the smudge resulting from the input of the next part of the password on the touch screen in addition to the current time also depends on the time between the input of the parts of the password. It is furthermore provided that the speed at which the timepiece resets to the initial position is sufficiently fast to go through a certain angle before the user touches the touch screen to enter the next part of the password. This is necessary to allow the reset of the timepiece to affect the resulting smudges on the touch screen. In a further embodiment it is provided that the reset speed of the bezel assumes a different value for each new input of the password.

FIG. 12 sequentially shows snapshots during the password entry of an embodiment of the method according to the invention at the time 4:05 o'clock. An analog timepiece is displayed on the touch screen 1, which consists of the elements hour hand 22, minute hand 23, bezel 24, dial 25, hour scale 26 and minute scale 27. The elements hour hand 22 and minute hand 23 of the timepiece cannot be moved by means of a contact with the touch screen. Furthermore, bezel 24, dial 25, hour scale 26 and minute scale 27 form a composite element of the timepiece, which can be rotated around the axis of rotation of the hands by means of a contact with the touch screen. In FIG. 12, the number combination "8-0-1" is entered by matching the corresponding hour index with the minute hand. In the embodiment, the number "0" is positioned at the hour "10". The three numbers to be entered here can represent the whole password but also only a part of the password. Further numbers of the password can therefore be entered both before and after the snapshots shown in FIG. 12 for a longer password. In the present embodiment, it is provided that a release of the contact with the touch screen triggers the registration of the password number.

In FIG. 12 (*a*), the touch screen is shown with the analog timepiece before entering the three numbers "8-0-1". In FIG. 12 (*b*), the bezel has been rotated by means of a contact of a finger 8 with the touch screen in the clockwise direction so that the hour "8" coincides with the minute hand. After releasing the contact in the position of the timepiece shown in FIG. 12 (*b*), thus, the number "8" is registered as part of the password to be entered. As shown in FIG. 12 (*c*), the bezel is now starting to slowly move back to its original position. During the return movement of the bezel, the hour "10" meets the minute hand, see FIG. 12 (*d*). As shown in FIG. 12 (*d*), in order to enter the next number "0" of the password, it is thus merely necessary to tap the screen briefly at the right time. Since with this tapping of the screen, the contact is released exactly when the hour "10" matches the minute hand, the number "0" of the password is registered now. It is not of importance here, at which position the contact with the touch screen occurs on the screen. As shown in FIG. 12 (*d*), for entering the password, the screen can therefore also be touched at a location next to the timepiece. After tapping the screen to enter the number "0", the bezel continues its reset movement. In FIG. 12 (*e*) the screen is shown after complete reset of the timepiece so that the current time can be read again. As the minute hand already points at the password number "1" to be entered now, it is not necessary to rotate the bezel. As shown in FIG. 12 (*f*), it suffices here to tap on the screen at an arbitrary position in order to enter the password. When releasing the contact with the screen, the position of the minute hand on the hour scale is then registered and the corresponding number is added to the password.

FIG. 13 shows successive snapshots for entering the password in the embodiment of FIG. 6 with the difference that the timepiece resets itself to the current time after entering the password. The resetting of the timepiece to the current time is carried out first after the adjustment of the hour number ray 42 in FIG. 13 (*c*) and the subsequent release of the contact of the finger 8 with the touch screen 1. In FIG. 13 (*d*) the hour display has already moved back by two hours. While the hour display resets to the current hour, the minute display is adjusted to enter the password from FIG. 13 (*d*) to FIG. 13 (*e*). After releasing the contact with the minute display, the minute display resets to the current time as well. After the password entry was carried out, thus, the current time can be read again in FIG. 13 (*f*).

Compared with the embodiment in FIG. 6, the automatic resetting of the timepiece in FIG. 13 has the advantage that the complete password is never displayed on the screen.

In FIG. 14 sequential snapshots for entering the password in the embodiment of FIG. 13 are shown with the difference that the password entry is not carried out on the hour number ray 42 and the minute number ray 43 together, but successively only on the minute number ray 43. As in FIGS. 6 and 12, the password is "05-32". For this purpose, in FIG. 14 (*b*), a contact on the minute number ray is established with a finger 8 in order to then set the minute number ray in motion upwards. In this way, it can be scrolled through the numbers of the minute display until the first number of the password appears on the screen. In FIG. 14 (c), the first number of the password "05" has appeared, which is tapped with the finger. The movement of the minute display is stopped by the tapping and the number of the password is registered.

For registering the numbers of the password, it is not of importance in the embodiment in FIG. 14, where the numbers of the password are tapped on the screen. As a tapping corresponds to a very short contact, the finger is not in contact with the touch screen after the registration of the first number of the password and the display starts to reset to the current time, see FIG. 14 (d). In FIG. 14 (e) the display has reset to the current time and the second number of the password has appeared on the screen. As shown in FIG. 14 (e) this number is now also tapped for registration of the second number of the password. After successfully entering the password, the current time is displayed again in FIG. 14 (f).

In contrast to the example provided in FIG. 14, it is provided in a further embodiment of the method according to the invention that all numbers of the password have to be tapped at one and the same position on the screen for the registration. This has the advantage that the smudges and prints generated by tapping on the touch screen overlay one another and thus additionally hamper an identification of the password.

FIG. 15 sequentially shows snapshots of the password entry of an embodiment of the method according to the invention similar to that in FIG. 7 at the time 8:30 o'clock. In the embodiment of FIG. 15, the current hour is reproduced based on individual number rays 421 and 422 and the current minute is reproduced based on individual number rays 431 and 432. The number ray 421 moves down by one value every ten hours, the number ray 422 every hour, the number ray 431 every ten minutes and the number ray 432 moves down one value at a time every full minute. For the password entry, the numbers of the password are to be set separately on the four number rays 421, 422, 431, 432. The password to be set is "73:15" and no particular chronological order of entry is required for a correct password input. The setting of the numbers of the password is done by tapping on the respective number on the corresponding number ray.

The difference between the embodiment in FIG. 15 to that in FIG. 7 is that the number rays 421, 422, 431 and 432 run continuously for the password entry. This running of each number ray is similar to the running due to the time. In the present example, the running of the number rays can be described as an upward movement of the displayed numbers. All four number rays move at the same speed and the movement is slightly faster than that of a seconds display. Alternatively, the numbers may run downwards. The running can be carried out continuously or abruptly.

In FIG. 15 (a), the touch screen 1 is shown before entering the password at the time 8:30 o'clock. Thus, it is possible to read the time here before entering the password. Between FIG. 15 (a) and FIG. 15 (b), the password input was started so that the number rays now run upwards. This is evident from the fact that the numbers "08:30" in FIG. 15 (b) are no longer shown in the middle, but have moved upwards by one row. The start of the password entry can be caused by contact with the touch screen or pressing a function key. Alternatively, it is provided that the number rays start to run after a defined delay after displaying the timepiece.

In FIG. 15 (c), the number rays have moved up by another number, so that the numbers "08:30" can be seen in the top row of numbers. A number of the password is now entered by means of a stylus 9. This is the third digit of the password with the number "1" which is located in the middle of the number ray 431 in FIG. 15 (c). As shown in FIG. 15 (c), the number "1" of the password is entered by tapping the corresponding number on the number ray 431. In the embodiment in FIG. 15, the tapping of a number of the password results in a stop of the movement of the corresponding number ray. Hereby it is immediately apparent which digit of the password has already been entered. In an alternative embodiment, it is provided that the number ray continues its movement after pressing the number of the password.

In FIG. 15 (d), the number rays 421, 422 and 432 have moved up by another number. Here, the fourth digit of the password is now entered. By tapping the number "5", it is registered as part of the password. In the present embodiment it is not of importance in this connection, where the number of the password is located in the corresponding number ray on the screen. This has the advantage that the password is not readily seen on the screen after fully completed password entry. In the present example in FIG. 15 (d), the number of the fourth digit of the password is tapped in the bottom row with the stylus 9. In FIG. 15 (e), the number rays on which no number of the password has been entered yet have moved up by another digit. Here, the second digit of the password "3" is now entered. In FIG. 15 (f), finally, the last digit of the password has been tapped on the remaining number ray 421, so that now the whole password has been entered.

In FIG. 16, an embodiment of the method according to the invention is shown with an electronic device 70 with a screen 1 and a function key or accordingly button 71. The function key 71 registers both the direction of a swiping over the key as well as a pressing of the key. Such buttons can be found for example in smartphones by the brand HTC such as the model HTC Desire Z. The password entry in the present embodiment is not carried out by means of the screen 1 but instead by means of the button 71. For entering the password, the password "5:32" is set on the displayed timepiece by swiping vertically over the button 71 and by pressing the button by means of a finger 8.

In FIG. 16 (a), the device 70 is shown with a digital timepiece displayed on the screen 1 with an hour display 42 and a minute display 43 at the time 8:30 o'clock. The number displayed by the hour display 42 of the digital timepiece is now decreased by a vertical swipe of the finger 8 over the button 71 from above to below. As shown in FIG. 16 (b), thus, the number "05" in set on the hour display 42. For registration of the number set as a part of the password, now, the button is pressed. By pressing the button, the minute display 43 is now adjustable by means of a swiping with the finger over the button. As shown in FIG. 16 (c), the displayed minute is increased by means of a vertical swiping over the button from below to above. Once the number corresponding to the password is set on the minute display 43, now, the button 71 is pressed to register the full password, see FIG. 16 (d).

In the embodiment of the method according to the invention from FIG. 16 no traces were left on the touch screen that can be used to identify the entered password. Furthermore, the timepiece displayed to enter the password only occupies a small fraction of the display. As an alternative to a function key it is provided in other embodiments to use a wheel, a trackball or a scroll wheel directly on the device or on an external device, such as a mouse for entering the password. By turning this input device, here, an element of the timepiece is adjusted and by pressing this or other input devices, the position of the element of the timepiece is registered and the next entry on the same or another element of the timepiece is facilitated.

FIG. 17 sequentially shows four snapshots of an embodiment of the method according to the invention for the password entry by means of a timepiece with power reserve indicator. In this example, the power reserve is displayed by means of two discs 82, 83. On the two discs 82, 83 of the power reserve, the numbers "0" to "9" are plotted. The indicator field 81 of the power reserve frames one number of each of the two discs 82, 83. The numbers displayed in the indicator field 81 from the two discs 82, 83 represent the power reserve, which hence is displayed digitally. In the present embodiment, the power reserve displays the state of charge of the battery as a percentage. With decreasing charge the left disc 82 thus rotates counterclockwise and the right disc 83 rotates in the clockwise direction. Accordingly, the left disc 82 rotates in the clockwise direction during charging of the battery and the right disc 83 rotates in the counterclockwise direction. In addition to the power reserve, the timepiece features an analog display 80 of hour and minutes.

FIG. 17 (*a*) shows the embodiment of the method according to the invention before entering the password at the time 4:00 o'clock. The battery level displayed in the indicator field 81 of the power reserve is 73%. The password is "0-7" and is to be set in the indicator field 81 by the two discs 82, 83. For this, the discs 82, 83 can be adjusted by means of a contact with the touch screen. After an adjustment of one of the discs 82, 83 and releasing the contact with the touch screen, the discs 82, 83 reset themselves, so that the entered password is never displayed on the screen.

In FIG. 17 (*b*), the left disc 82 of the power reserve indicator was rotated in clockwise direction by means of a contact with a finger 8 with the touch screen 1. The first number of the password "0" was set in the indicator field 81. By releasing the contact with the touch screen, the position of the adjusted disc is registered and assigned to the password. After releasing the contact with the touch screen the adjusted disc 82 starts to rotate back counterclockwise to the position that corresponds to the state of charge of the battery.

In FIG. 17 (*c*), the second number of the password "7" was set in the indicator field 81 of the power reserve by means of the right disc 83. In FIG. 17 (*c*), the left disc 82 is still in reset operation. After releasing the contact of the finger 8 with the touch screen 1, the second number of the password is registered using the position of the disc 83. The right disc 83 also moves back to the position which corresponds to the current state of charge of the battery, see FIG. 17 (*d*).

In further embodiments of the method according to the invention with timepieces with power reserve indicator, a combined password entry is provided by means of the display of hours, minutes and power reserve. With a four-digit password, for example, the first two numbers of the password can be entered as in the embodiment from FIG. 3 using the hour and minute hands and the following two numbers of the password can be entered as in the embodiment from FIG. 17 using the power reserve.

The power reserve indication of a timepiece can be done in different ways. Similar to the embodiment of FIG. 17 with two number discs, three number discs can also be used, see patent specification US 2011/0182152 A1. The use of a hand which moves between "Auf" and "Ab" on a full-circle or semi-circle scale is also possible. Here, the values "empty", "half charged" and "fully charged" can for example be used as part of the password.

The power reserve indicator in FIG. 17 can also be used as a date display. Here, the number of the day of the corresponding month is displayed from "1" to "31" in the indicator field 81 using the two disks 82, 83. Here, the password entry by the method according to the invention can be carried out as shown in FIG. 17, with the difference that the number displayed in the indicator field 81 before entering the password cannot be greater than "31".

A further embodiment of the method according to the invention for entering a password is shown in FIG. 18. The timepiece used in the example in FIG. 18 has an analog minute hand 92 which indicates the current minute on a circular dial 91 with a 60-minute scale and the minute indices 93. In FIG. 18 (*a*), thus, the minute hand 92 points at the minute "7". The current hour is displayed digitally by means of an hour disc 90. On the hour disc, the hours "1" to "12" are printed. Every hour, the hour wheel 90 moves in the clockwise direction by one number. The current hour is read at the position of the minute "0" or accordingly "60" and thus equals "10" in FIG. 18 (*a*). The time indicated by the timepiece in FIG. 18 (*a*) is 10:07 o'clock.

To enter the password using the timepiece shown in FIG. 18 (*a*), the hour disc 90 can be moved and tapped by means of a contact with the touch screen 1. The minute hand 92 with the corresponding scale is not adjustable. With an adjustment of the hour disc, after releasing the contact with the touch screen, the hour at which the minute hand points is registered as a number of the password to be entered. With a tapping on the hour disc, however, the hour is registered as a number of the entered password which is tapped. The password to be entered is "5-4-9-1".

In FIG. 18 (*b*) the hour disc 90 was rotated counterclockwise by about 110 degrees by means of a contact with a finger 8 with the touch screen 1 so that the minute hand 92 points at the hour "5". After releasing the contact with the touch screen, thus, the first number of the password "5" is registered. The three other numbers of the password "4-9-1" are successively tapped on the hour disc with the finger in FIGS. 18 (*c*) through 18 (*e*) without changing the angular position of the hour disc. Thus, the password is fully entered. In FIG. 18 (*f*) the timepiece is shown after the password entry.

The embodiment of the method of FIG. 18 has the advantage that the password entry can be carried out very quickly, as the numbers of the password can simply be tapped. As the hour disc 90 changes its angular position with every hour, the smudges of the finger after password entry are located at different positions at different hours. This makes it difficult to decrypt the password entered on the basis of smudges on the screen. Due to the possibility of a manual adjustment of the hour disc as in FIG. 18 (*b*), decrypting the entered password may be even more difficult.

In the embodiment of FIG. 18, the numbers corresponding to the password on the hour disc 90 are aligned with the minute hand 92. Alternatively, the numbers of the password can be entered independently from the minute hand. In a further embodiment, the numbers corresponding to the password on the hour disc are set at the position of the minute "0" or accordingly "60". In principle, any angular position can be defined for the password entry. The angular position would preferably be specified when defining the password along with the other settings for the password entry.

In FIG. 19 sequential snapshots are shown for entering a password of another embodiment of the method according to the invention. The timepiece displayed on the touch screen 1 in this example features an hour hand 22, a minute hand 23 and a dial 25 with minute indices 27 and hour indices 26. The hours 29 are printed on the bezel 24. The time displayed in FIG. 19 (*a*) is 4:07 o'clock.

On the timepiece from the embodiment in FIG. 19, the bezel 24 can be rotated together with the dial 25, the hour indices 26, the minute indices 27 and the hours 29 printed on the bezel by means of a user input. The numbers printed on the bezel are used for the password entry. It is provided in the password entry, that the hour index corresponding to the first number of the password is matched with the minute hand by rotating the bezel. The following numbers of the password can be tapped on the bezel or are again matched with the minute hand. For the registration of the second, third and further numbers of the password, in each case, the positions at the beginning and end of the contact with the screen 1 are detected. In the event that both positions are equal, a number of the password is assigned to the common position. In the event that both positions are different, a number of the password is assigned to the start of the contact as well as to the end of the contact. For the position at the beginning of the contact, here, the number tapped on the bezel is assigned to the password. At the end of the contact then the number on the bezel is assigned to the password at which the minute hand is pointing. The password entered in FIG. 19 is "3-7-1-12".

In FIG. 19 (*a*) the screen 1 is displayed before the password entry at the time 4:07 o'clock. In FIG. 19 (*b*), the bezel 24 has been rotated by means of a touch of a finger 8 in the counter-clockwise direction so that the hour "3" coincides with the minute hand 23. After releasing the contact with the screen, the hour matching the minute hand is registered as the first number of the password. In FIGS. 19 (*c*) and 19 (*d*), the second number "7" and the third number "1" of the password are tapped. The contact with the screen to enter the third number is maintained for rotating the bezel. In FIG. 19 (*e*), the position of the contact of the finger with the screen is shown at which the screen contact initiated in FIG. 19 (*d*) is completed. Thus, FIG. 19 (*d*) shows the position at the beginning of the contact and FIG. 19 (*e*) shows the position of the end of the contact. Since both positions are different, numbers of the password are assigned to both positions separately. In FIG. 19 (*d*), the tapped number "1" is assigned to the password. Subsequently, in FIG. 19 (*e*), the number "12" matching the minute hand is assigned to the password. In FIG. 19 (*f*) the timepiece displayed on the screen is shown after successful entry of the password.

In an alternative embodiment of the method according to the invention several taps on the screen are necessary to enter the first number of the password, where the timepiece displayed on the touch screen is adjusted by means of the first contact, see FIG. 20. In FIG. 20 (*a*) an analog timepiece is displayed on a touch screen 1 with an hour hand 22 and a minute hand 23 at the time 3:36 o'clock. In the following FIG. 20 (*b*) a contact is established with the touch screen with a finger 8 at the position of the minute hand. The timepiece displayed is now adjusted with a contact by means of the minute hand, see FIG. 20 (*c*). In FIG. 20 (*d*) the adjusted timepiece is shown, which now displays the time 4:07 o'clock. By means of further contacts on the adjusted timepiece a password can now be entered such as in the embodiments of FIG. 4, 11 or 12, so that multiple user inputs are required for entering the first digit of the password.

The additional adjustment of the timepiece as in the embodiment of FIG. 20 may serve the purpose to further hamper the decryption of the password based on the smudges on the screen. In order to adjust the hands of an analog timepiece, they can be touched very close to the axis of rotation. This allows a hand to be adjusted by a relatively large angle by means of a very small movement. This has the consequence that the new hand positions can only be identified very imprecisely by smudges left on the touch screen from adjusting the hands.

The additional adjustment of the timepiece as in the embodiment of FIG. 20 can also serve the purpose of facilitating the password entry. An example is a password entry on the timepiece from FIG. 18 (*a*) by adjusting the hour disc 90, where the hours corresponding to the numbers of the password have to be aligned with the minute hand 22. When the minute hand points at the minute "30" for the password entry, for example, the hour numbers would be upside down when matching the minute hand. This could easily lead to confusion of the hours "6" and "9". To prevent this, the minute hand could for example be set to the minute "55" so that the hour numbers are not upside down when matching the minute hand.

The invention claimed is:

1. A method for entering a password into a computing device, comprising:
   providing a display means which is coupled to a data processing means of the computing device,
   displaying a representation of a timepiece on the display means, where the representation of the timepiece includes a first timepiece element whose value, orientation or position varies with time,
   detecting, by the data processing means, a user input which causes a change in value, orientation or position of the first timepiece element from an initial state indicative of current time to an end state;
   assigning, by the data processing means, a value to a user password based on the end state of the first timepiece element;
   resetting, by the data processing means, the value orientation or position of the first timepiece element to the initial state or to a further state which differs from the end state after completion of the user input, the step of resetting occurring without user input;
   comparing, by the data processing means, the user password to a stored password; and
   executing, by the data processing means, access control action on the computing device when the user password matches the stored password.

2. The method of claim 1, wherein the first timepiece element is further defined as an hour hand or a minute hand of a clock.

3. The method according to claim 1, wherein the first timepiece element is moved from an initial position to a subsequent position and the value of the password is assigned in accordance with the subsequent position.

4. The method of claim 1 further comprises:
   detecting, by the data processing means, a second user input which causes a second change in value, orientation or position of the first timepiece element after the first timepiece element is reset to the initial state or to the further state; and
   assigning, by the data processing means, a value to the password based on the second change in value, orientation or position of the timepiece.

5. The method according to claim 1 further comprises:
   displaying a representation of a second timepiece on the display means, where the representation of the second timepiece includes a second timepiece element whose value, orientation or position varies with time,
   detecting, by the data processing means, a user input which causes a change in value or position of the second timepiece element, and
   assigning, by the data processing means, a second value to the password based on the change in value, orientation or position of the second timepiece element.

6. The method according to claim 1, further comprises:
   detecting, by the data processing means, a second user input which causes a second change in value, orientation or position of the first timepiece element, and
   assigning, by the data processing means, a second value to the password based on the second change in value, orientation or position of the first timepiece element.

7. The method according to claim 1, further comprises
detecting, by the data processing means, a second user input which does not cause a change in value, orientation or position of the first timepiece element, and
assigning, by the data processing means, a second value to the password based on the second user input.

8. The method according to claim 1, wherein the user input comprises a plurality of actions of a user.

9. The method according to claim 1, wherein the user input comprises exactly one action of the user and a plurality of alphanumeric characters of the password are assigned to said user input.

10. The method according to claim 1, wherein the display means is a touch-sensitive display means, and as user input, one or more contacts of the display means are detected.

11. The method according to claim 1, wherein the timepiece is represented as an analog timepiece and the first timepiece element is an hour hand, a minute hand, a second hand or a power reserve indicator.

12. The method according to claim 1, wherein the first timepiece is represented as a digital timepiece and the timepiece element is one or more numbers or one or more letters.

13. A computer program product which is stored on a non-transitory computer readable medium and when executed by means of a data processing device is configured to carry out the steps comprising:
displaying a representation of a timepiece on a display means which is coupled to the data processing device, where the representation of the timepiece includes a first timepiece element whose value, orientation or position varies with time,
detecting a user input which causes a change in value, orientation or position of the first timepiece element from an initial state indicative of current time to an end state;
assigning a value to a user password based on the end state of the first timepiece element;
resetting the value orientation or position of the first timepiece element to the initial state or to a further state which differs from the end state after completion of the user input, the step of resetting occurring without user input;
comparing the user password to a stored password; and
executing access control action on the computing device when the user password matches the stored password.

14. A method for entering a password into a computing device, comprising:
providing a display means which is coupled to a data processing means of the computing device;
displaying a representation of a timepiece on the display means, where the representation of the timepiece includes a first timepiece element whose value, orientation or position varies with time, and a second timepiece element whose value, orientation or position is independent of time;
detecting, by the data processing means, a user input which causes a change in value, orientation or position of the second timepiece element from an initial state indicative of current time to an end state;
assigning, by the data processing means, a value to a user password based on the end state of the second timepiece element relative to the value, orientation or position of the first timepiece element;
resetting, by the data processing means, the value orientation or position of the second timepiece element to the initial state or to a further state which differs from the end state after completion of the user input, the step of resetting occurring without user input;
comparing, by the data processing means, the user password to a stored password, and
executing, by the data processing means, access control action on the computing device when the user password matches the stored password.

15. The method of claim 14, wherein the first timepiece element is further defined as an hour hand or a minute hand of a clock.

16. The method of claim 14 further comprises:
detecting, by the data processing means, a second user input which causes a second change in value, orientation or position of the second timepiece element after the second timepiece element is being reset to the initial state or to the further state; and
assigning, by the data processing means, a value to the password based on the second change in value, orientation or position of the second timepiece element.

17. The method according to claim 14, wherein the user input comprises a plurality of actions of a user.

18. The method according to claim 14, wherein the user input comprises exactly one action of the user and a plurality of alphanumeric characters of the password are assigned to said user input.

19. The method according to claim 14, wherein the display means is a touch-sensitive display means, and as user input, one or more contacts of the display means are detected.

20. The method according to claim 14, wherein the timepiece is represented as an analog timepiece and the second timepiece element is a dial or a bezel.

* * * * *